United States Patent [19]
Hasuo

[11] Patent Number: 5,572,726
[45] Date of Patent: Nov. 5, 1996

[54] ELECTRONIC FILING APPARATUS

[75] Inventor: Kamon Hasuo, Kawasaki, Japan

[73] Assignee: Canon Kabushiki Kaisha, Tokyo, Japan

[21] Appl. No.: 307,034

[22] Filed: Sep. 16, 1994

Related U.S. Application Data

[63] Continuation of Ser. No. 76,684, Jun. 15, 1993, abandoned, which is a continuation of Ser. No. 477,470, Feb. 9, 1990, abandoned.

[30] Foreign Application Priority Data

Feb. 9, 1989 [JP] Japan ................................. 1-30794
Mar. 7, 1989 [JP] Japan ................................. 1-54557
Mar. 7, 1989 [JP] Japan ................................. 1-54558

[51] Int. Cl.⁶ .......................... G06F 7/28; G06F 15/40
[52] U.S. Cl. ................. 395/616; 364/963; 364/413.22; 382/305; 382/306; 395/427; 395/348
[58] Field of Search ...................... 395/600, 425; 364/413.22; 382/305, 306

[56] References Cited

U.S. PATENT DOCUMENTS

| | | | |
|---|---|---|---|
| 4,408,181 | 10/1983 | Nakayama | 82/61 |
| 4,553,206 | 11/1985 | Smutek et al. | 364/300 |
| 4,574,395 | 3/1986 | Kato | 382/61 |
| 4,737,912 | 4/1988 | Ichikawa | 364/413 |
| 4,748,678 | 5/1988 | Takeda et al. | 382/56 |
| 4,760,526 | 7/1988 | Takeda et al. | 364/300 |
| 4,808,987 | 2/1989 | Takeda et al. | 340/721 |
| 4,899,292 | 2/1990 | Montagna et al. | 364/521 |
| 4,985,930 | 1/1991 | Takeda et al. | 382/56 |
| 5,054,096 | 10/1991 | Beizer | 383/41 |
| 5,081,449 | 1/1992 | Kurosu et al. | 340/721 |

FOREIGN PATENT DOCUMENTS 61-26147  2/1986  Japan .
62-272365 11/1987 Japan .
63-4334   1/1988  Japan .

OTHER PUBLICATIONS

Chang, S. and Liu, S., "Picture Indexing and Abstraction Techniques for Pictorial Database", IEEE Trans. on PAMI vol. PAMI-6, No. 4, pp. 475–484, (1984).

Primary Examiner—Raymond J. Bayerl
Assistant Examiner—A. Katbab
Attorney, Agent, or Firm—Fitzpatrick, Cella, Harper & Scinto

[57] ABSTRACT

An electronic data filing apparatus is disclosed, which includes a unit for displaying an index image for retrieval of data stored in a data storing medium, a unit for storing relative data representing a relation between the data and the index image, a unit for selecting at least one index image from a plurality of index images displayed on the displaying unit, a unit for selecting at least one index image from a plurality of index images displayed on the displaying unit, and a unit for executing retrieval of data according to index image selected by the selecting unit and relative data stored in the storing unit. When a plurality of index images are selected by the selecting unit the retrieval means executes retrieval of data with a combination of relative data corresponding to individual selected index images.

26 Claims, 31 Drawing Sheets

FIG. 6

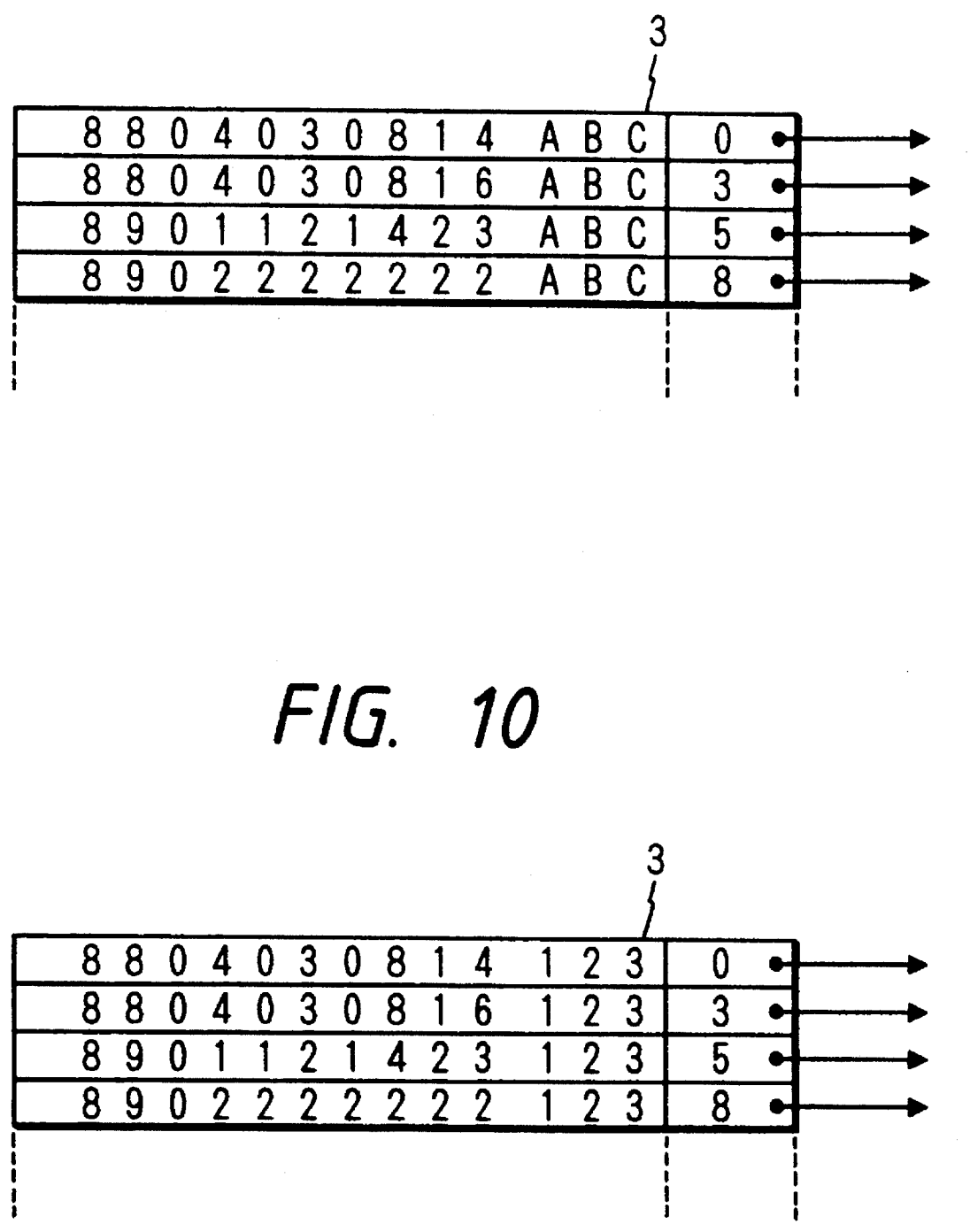

| 8 8 0 4 0 3 0 8 1 4 | A B C | 0 |
| 8 8 0 4 0 3 0 8 1 6 | A B C | 3 |
| 8 9 0 1 1 2 1 4 2 3 | A B C | 5 |
| 8 9 0 2 2 2 2 2 2 2 | A B C | 8 |

FIG. 10

| 8 8 0 4 0 3 0 8 1 4 | 1 2 3 | 0 |
| 8 8 0 4 0 3 0 8 1 6 | 1 2 3 | 3 |
| 8 9 0 1 1 2 1 4 2 3 | 1 2 3 | 5 |
| 8 9 0 2 2 2 2 2 2 2 | 1 2 3 | 8 |

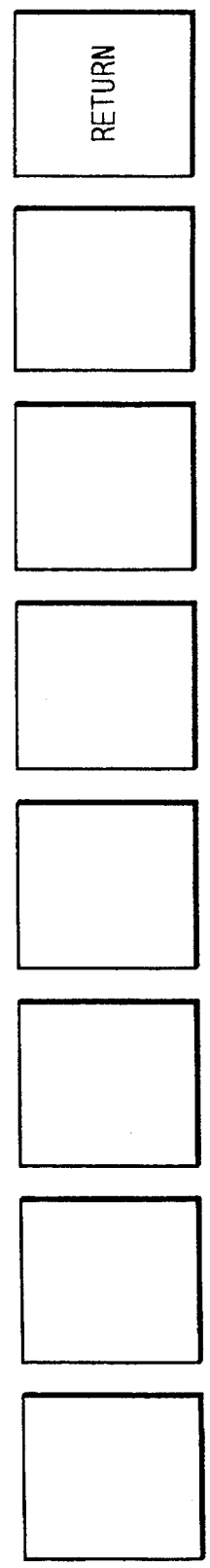

FIG. 30-3

54 : DISPLAY APPARATUS

FEB. 28, 1989    13HR. 37MIN. 24SEC.

FINAL EXPOSING
DATE AND TIME :

NUMBER OF EXPOSING :

RESIDUAL
AMOUNT OF DISK :

| K(1,1) | K(1,2) | K(1,3) | K(1,4) | K(1,5) |
| K(2,1) | K(2,2) | K(2,3) | K(2,4) | K(2,5) |
| A SECTION | B SECTION | C SECTION | D SECTION | |
| K(3,1) | K(3,2) | K(3,3) | K(3,4) | |
| K(4,1) | K(4,2) | K(4,3) | K(4,4) | |

| EXPOS-ING MODE | RETRIEV-AL MODE | INDEX DEFERRED ADDITION | SCANNER SETTING | | MANAGE-MENT MODE | INJEC-TION | |

55

| K1 | K2 | K3 | K4 | K5 | K6 | K7 | K8 |

FIG. 30-4

54: DISPLAY APPARATUS

FEB. 28, 1989    13HR. 37MIN. 24SEC.

KEYWORD :
KEY NUMBER :
DATE ID :
IMAGE ID :
RESIDUAL AMOUNT OF DISK : 1228

| K(1,1) | K(1,2) | K(1,3) | K(1,4) | K(1,5) |
| ☿ | ☏ | FAX | | |
| K(2,1) | K(2,2) | K(2,3) | K(2,4) | K(2,5) |
| A SECTION | B SECTION | C SECTION | D SECTION | |
| K(3,1) | K(3,2) | K(3,3) | K(3,4) | K(3,5) |
| ☆ | ◎ | ※ | | |
| K(4,1) | K(4,2) | K(4,3) | K(4,4) | K(4,5) |
| △△△ | ✂ | ♠ | | |

| STAMP SELECTION | STAMP SELECTION | STAMP SELECTION | STAMP SELECTION | STAMP SELECTION |

DECISION    EXECUTION OF RETRIEVAL    RETURN

55

| K1 | K2 | K3 | K4 | K5 | K6 | K7 | K8 |

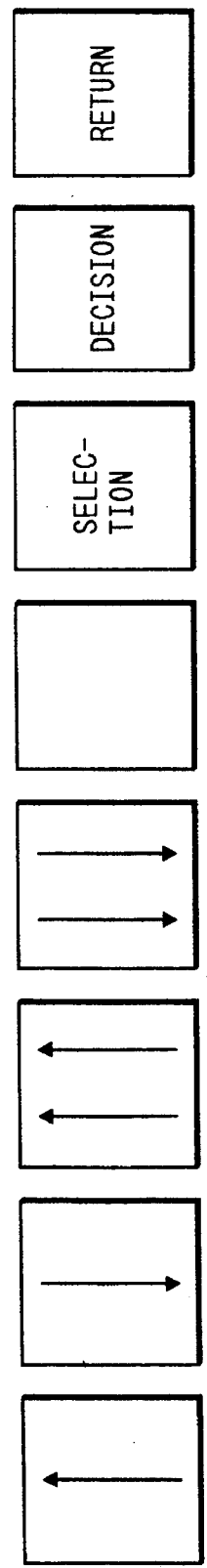

ELECTRONIC FILING APPARATUS

This application is a continuation of application Ser. No. 08/076,684 filed Jun. 15, 1993, now abandoned, which is a continuation of application Ser. No. 07/477,470 filed Feb. 9, 1990, which is now abandoned.

BACKGROUND OF THE INVENTION

1. Field of the Invention

This invention relates to data retrieval in an electronic filing apparatus.

2. Description of the Related Art

In prior art memory apparatus having a data retrieval function, data retrieval is carried out using retrieval data such as data file name, keyword corresponding to stored data and code number provided according to a predetermined rule. The retrieval data is produced according to data designated by a keyboard or the like.

When data retrieval in the prior art apparatus is carried out using file name, one file can not be given many characters, and it is impossible to permit various types of retrieval.

Where keyword is used for retrieval, a great deal of man-hour is required for the selection of keyword. In addition, it is difficult to designate an adequate keyword at the time of retrieval because there are many different words representing similar concepts.

Where code number is used for retrieval, with increase of memory items it becomes difficult to store code numbers corresponding to contents of retrieval. In practice, a code number has to be selected by using a conversion table at all times.

In either case noted above, it is necessary to input file name, keyword and code number by keying operation when storing data and also when executing retrieval. This operation requires skill and time, and it is difficult to increase the operational efficiency.

Further, with the prior art apparatus, if it is desired to retrieve images obtained from October to December of the last year or images obtained since 10 to 20 days ago, keywords or key numbers corresponding to the time when the images are obtained are searched for, and image retrieval is carried out on the basis of the keywords or key numbers that are found.

Therefore, when only the date and time of exposing are known, a time is required for the preparations for the image retrieval.

SUMMARY OF THE INVENTION

An object of the invention is to provide an electronic filing apparatus, which can overcome the drawbacks discussed above.

Another object of the invention is to provide an electronic filing apparatus, which permits a ready and speedy data retrieval operation.

A further object of the invention is to provide an electronic filing apparatus, which can display retrieval data and permits ready selection thereof.

A still further object of the invention is to provide an electronic filing apparatus, which can simplify a retrieval operation when the range of date and time of image registration is known.

The above and other objects of the invention will become more apparent from the following description with reference to the accompanying drawings.

BRIEF DESCRIPTION OF THE DRAWINGS

FIG. 6 is a schematic view showing specific contents of a directory in the same embodiment;

FIG. 10 is a schematic view showing specific contents of a directory in the same embodiment;

FIG. 23 is a schematic view showing specific contents in an index image identification data area in the same embodiment;

FIG. 26 is a schematic view showing specific contents of an index image identification data area in the same embodiment;

FIGS. 30-1 to 30-5 are views showing examples of display on a display in the same embodiment;

DETAILED DESCRIPTION OF THE PREFERRED EMBODIMENTS

Figure 1:
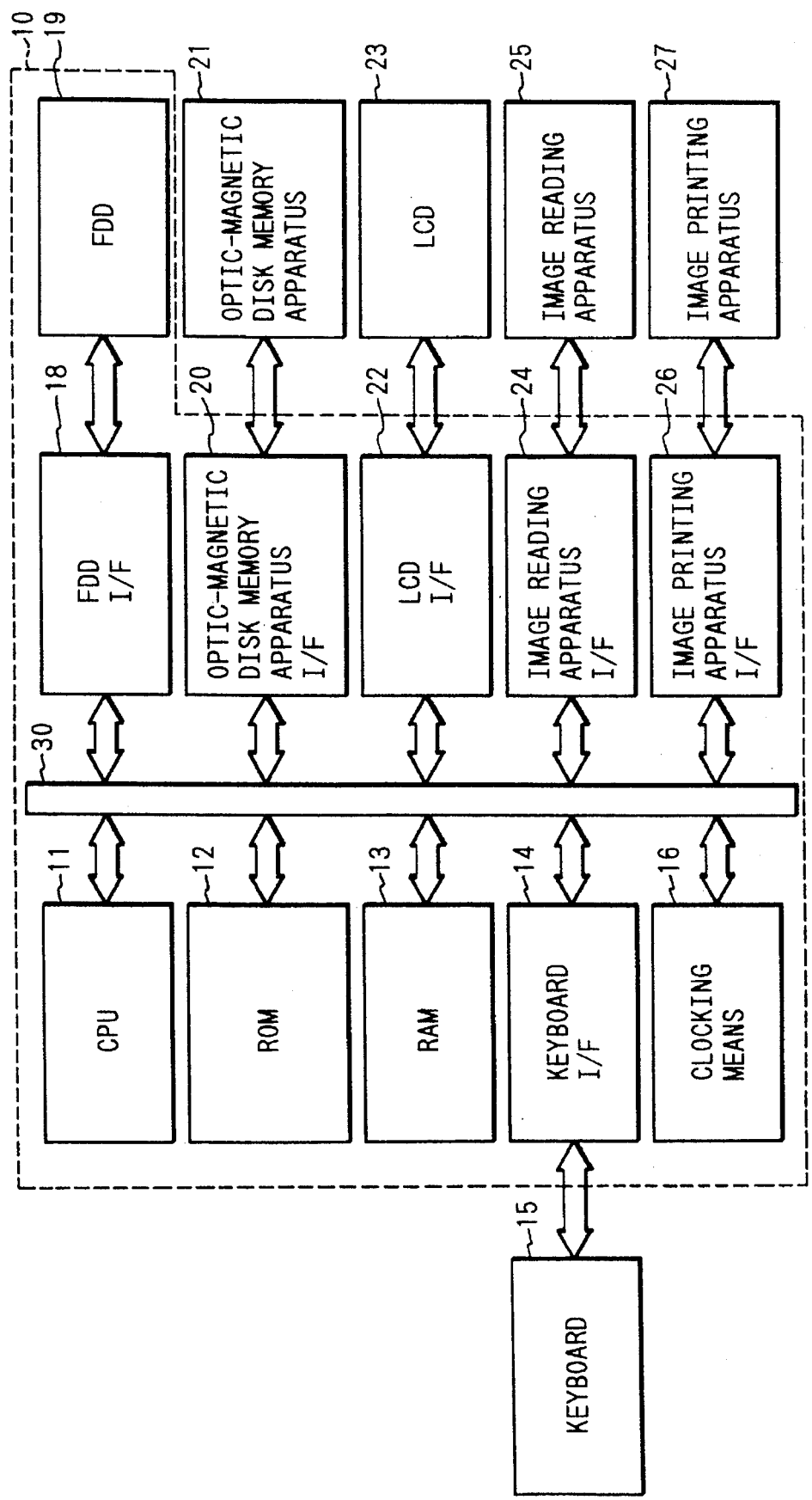
FIG. 1 is a block diagram showing the construction of a first embodiment of the data filing apparatus according to the invention.

FIG. 1 is a block diagram showing the construction of a first embodiment of the invention.

This data filing apparatus comprises central processor 10, keyboard 15, opto-magnetic disk memory apparatus 21, liquid crystal display 23, image reading apparatus 25 and image printing apparatus 27.

Central processor 10 includes CPU 11 as microprocessor, ROM 12 in which operation programs of CPU 11 are stored, and RAM 13 providing a word area of CPU 11 and a load area for various data and programs.

Central processor 10 further includes keyboard interface circuit 14 connecting keyboard 15 and system bus 30, floppy disk device interface circuit 19 connecting floppy disk device 19 and system bus 30, opto-magnetic disk memory apparatus interface circuit 20 connecting opto-magnetic disk apparatus 21 and system bus 30, liquid crystal display interface circuit 22 connecting liquid crystal display 23 and system bus 30, image reading apparatus interface circuit 24 connecting image reading apparatus 25 and system bus 30, and image printing apparatus interface circuit 26 connecting image printing apparatus 27 and system bus 26.

Clocking means 16 for counting data and time is further connected to system bus 30.

Figure 2:
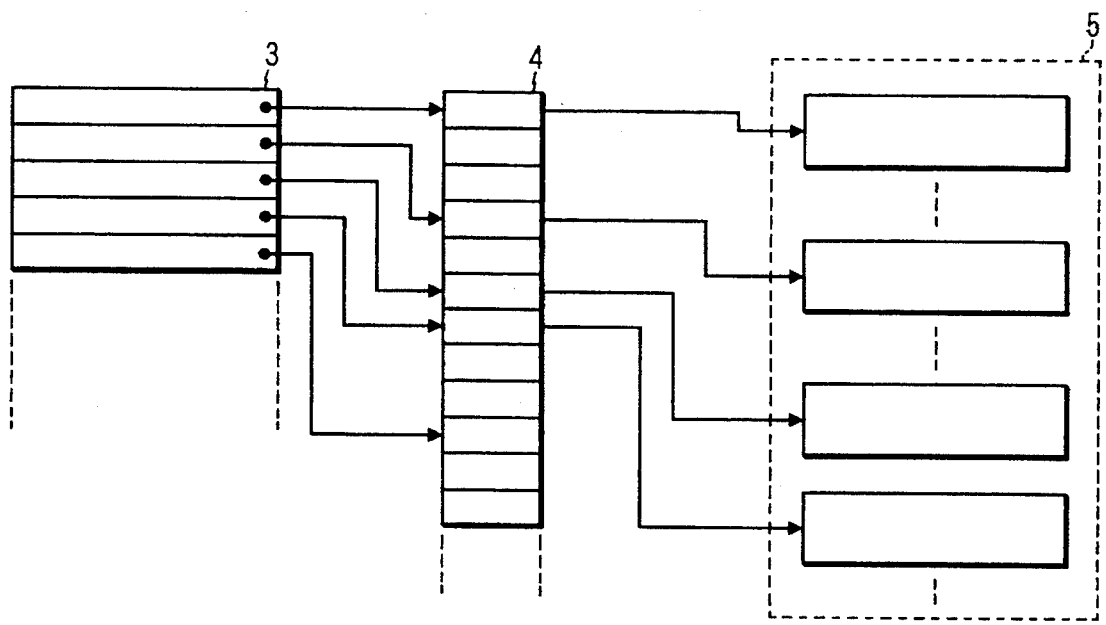
FIG. 2 is a schematic view showing memory area construction for data retrieval in the same embodiment.

FIG. 2 is a schematic view showing a memory area configuration in this embodiment of data filing apparatus.

Figure 3:
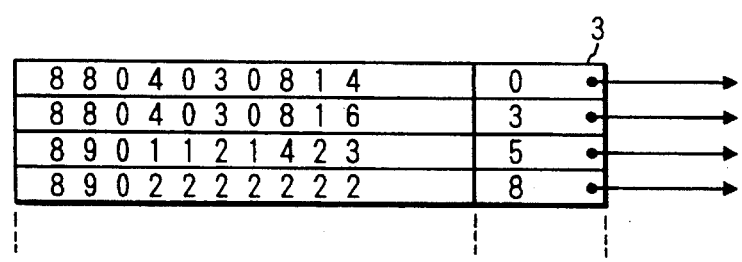
FIG. 3 is a schematic view showing specific contents of a directory in the same embodiment.

In this data filing apparatus, the retrieval of image data file group 5 is executed with directory 3 with retrieval data stored therein and FAT (file allocation table 4) for managing data recording addresses in recording medium. In this embodiment, when storing image data the corresponding date and time are input from clocking means 16, the date and time data being written in an empty area of directory 3, as shown in FIG. 3, and used as image identification data.

A summary of the operation of this data filing apparatus will now be described.

(1) Closure of power source

When the operator closes a power source switch (not shown), CPU 11 executes checking of the RAM and initializes internal parameters prescribed in ROM 12, executes initialization of the individual interface circuits and clears the liquid crystal display according to a program prescribed in ROM 12 to be ready for operation of the keyboard by the operator.

(2) Storing of image data

Subsequently, the operator instructs CPU 11 to read in image data for registration from the keyboard and sets original image on image reading apparatus 25.

CPU 11 detects, with a sensor provided in an original setting section of the image reading apparatus and through image reading apparatus interface circuit 24, that the original is set. In consequence, it provides a start signal to image reading apparatus 25 through image reading apparatus interface circuit 24 for reading image data into RAM 13. Further, for giving confirmation of exposing to the operator, CPU 11 displays image data in RAM 13 on liquid crystal display 23 through liquid crystals display interface circuit 23.

Then, CPU 11 receives image reading date and time data from clocking means 16 and stores as image discrimination code in an empty area of directory 3 in opto-magnetic disk memory apparatus 21 through opto-magnetic disk memory apparatus interface circuit 20. Further, it stores image data in an empty area of data file in opto-magnetic disk memory apparatus 21.

The relation between image identification codes in directory 3 and image data is managed by providing directory 3 with pointers representing FAT numbers corresponding to image data memory areas.

(3) Copying operation

Figure 4:
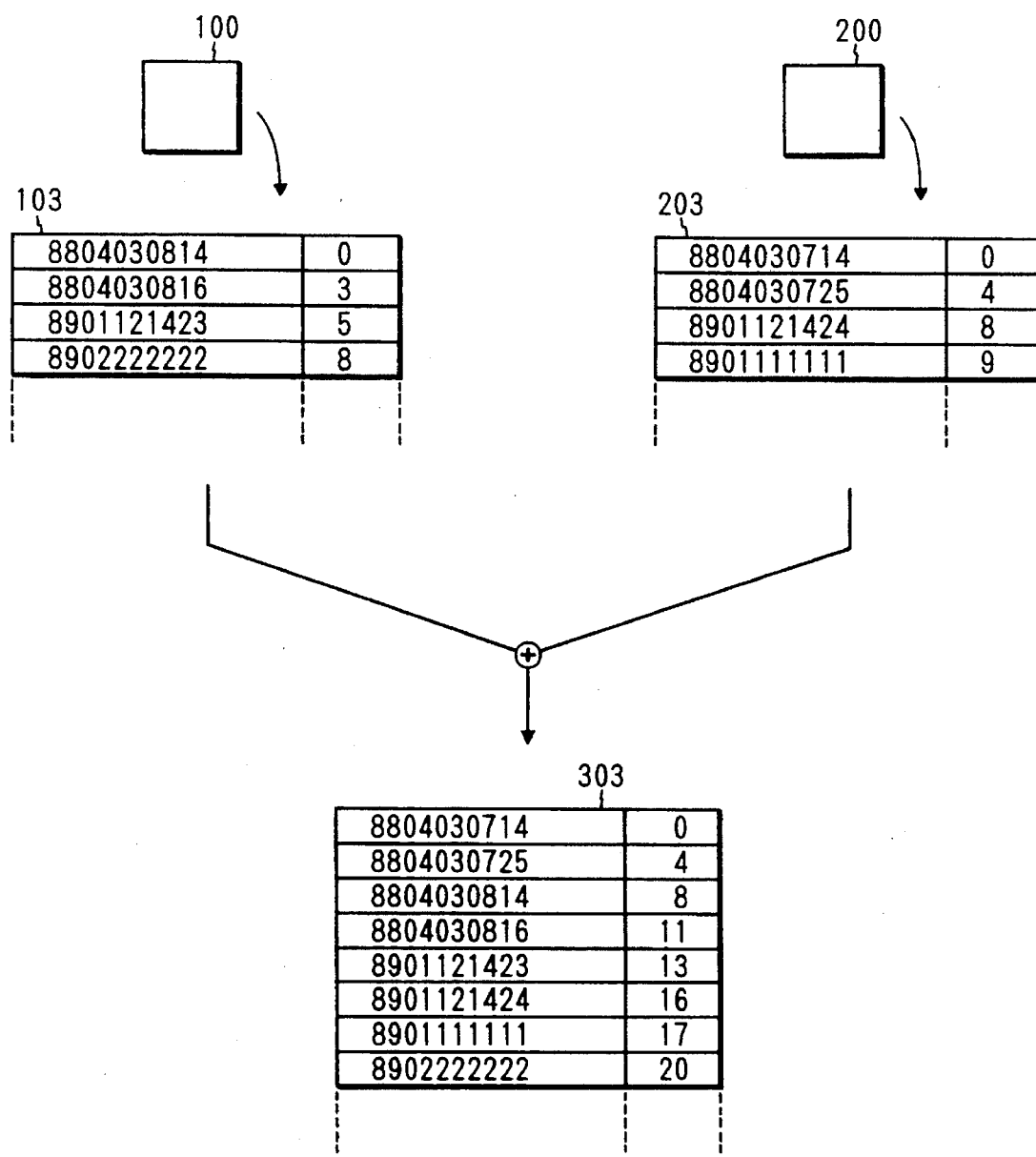
FIG. 4 is a schematic view showing a directory management system when copying data on more than one data storing media in the same embodiment.

FIG. 4 is a schematic view showing a system for managing directory 3 when copying data of data storing media.

Referring to FIG. 4, directories 103 and 203 are for opto-magnetic disk data storing media 100 and 200 carrying stored data.

When copying the data on these two media on a common opto-magnetic disk medium, image identification data after copying and synthesis are synthesized and managed on directory 303 for a directory produced for a plurality of data storing media is provided with own image identification codes.

In this embodiment, opto-magnetic disks are used as image storing medium. However, this is by no means limitative, and it is possible to use magnetic disks, optical disks, IC cards, laser cards, etc. as well. This also applies to the following embodiments as well.

Figure 5:
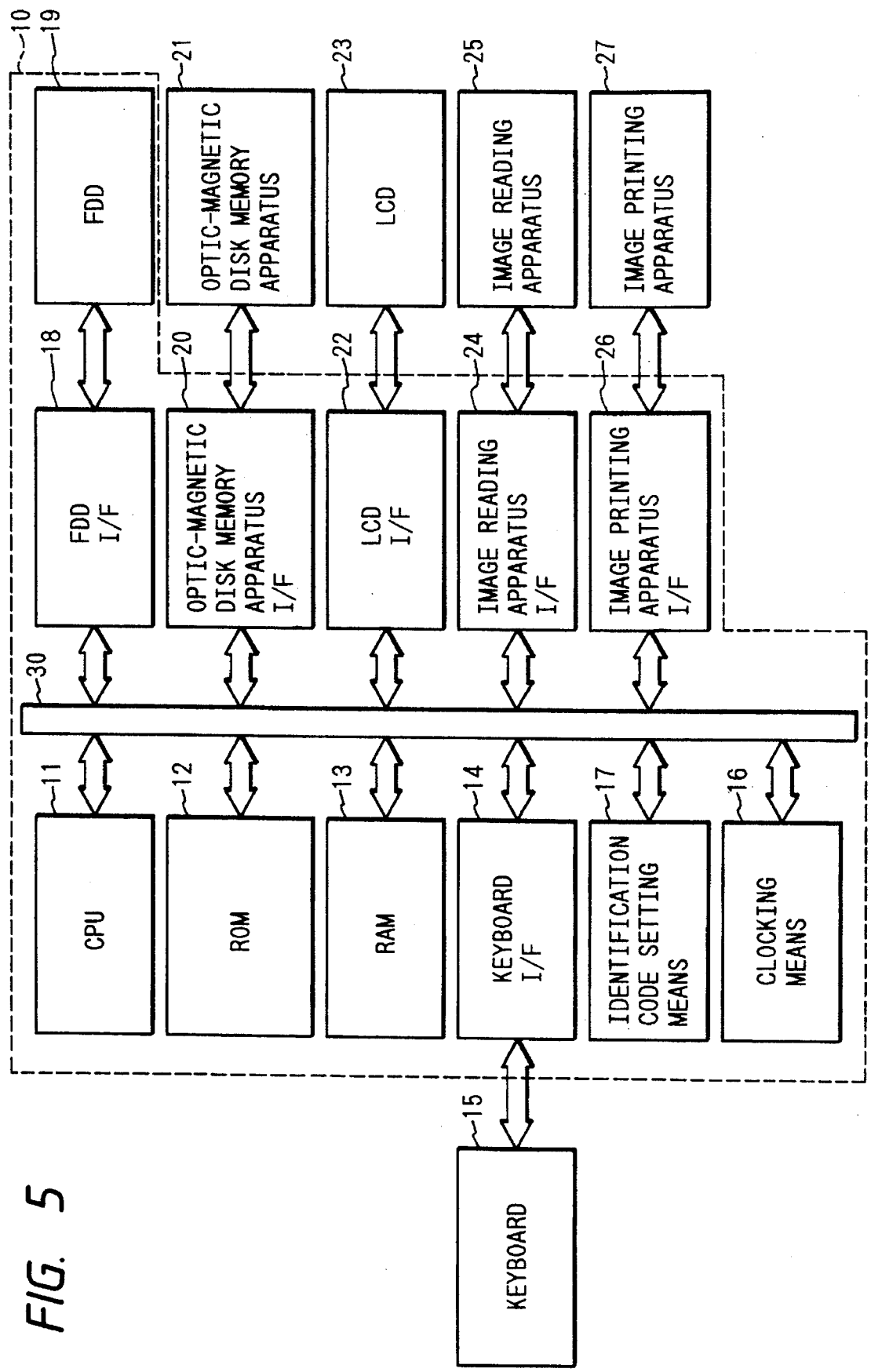
FIG. 5 is a block diagram showing the construction of a second embodiment of the data filing apparatus according to the invention.

FIG. 5 is a block diagram showing the construction of a second embodiment of the invention.

In this embodiment of image filing apparatus, identification code setting means 17 is provided in addition to identification codes in the clocking means of the preceding embodiment. Identification code setting means 17 consists of dip switches or batter backed-up RAM. Given code data is set as apparatus identification code by the operator by switch operation or keying operation prior to the image reading operation.

In this embodiment, like the above embodiment, date and time data at the time of image reading from clocking means 16 is stored together with apparatus identification code of identification code setting means 17 in an empty area of directory 3, as shown in FIG. 6.

Since in this embodiment image identification code contains apparatus identification code, even when images read out at identical times with different image filling apparatus are copied on a common image filing apparatus or image storing medium, both image data can be stored such that they are capable of independent retrieval from each other. In this case, directory 3 is managed in a manner as shown in FIG. 7.

Figure 7:
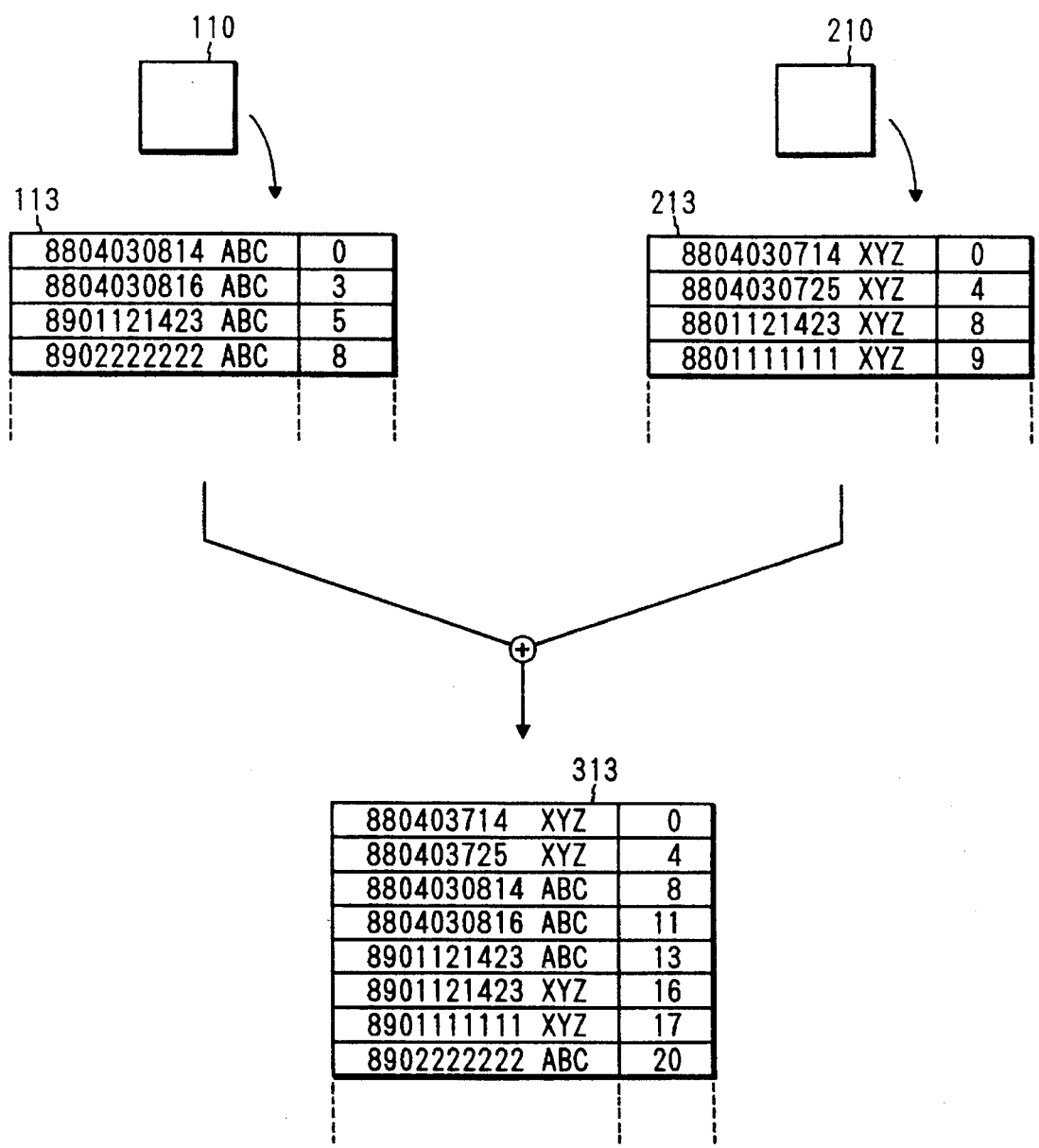
FIG. 7 is a schematic view showing a directory management system when copying data on more than one data storing media in the same embodiment.

Referring to FIG. 7, directories 113 and 213 are for opto-magnetic disk data storing media 110 and 210 carrying stored data.

When copying the data on these two media on a common opto-magnetic disk medium, image identification data after copying and synthesis are synthesized and managed on directory 313 for a directory produced for a plurality of data storing media is provided with its own image identification codes.

The other construction and operation are substantially the same as those of the previous embodiment.

Figure 8:
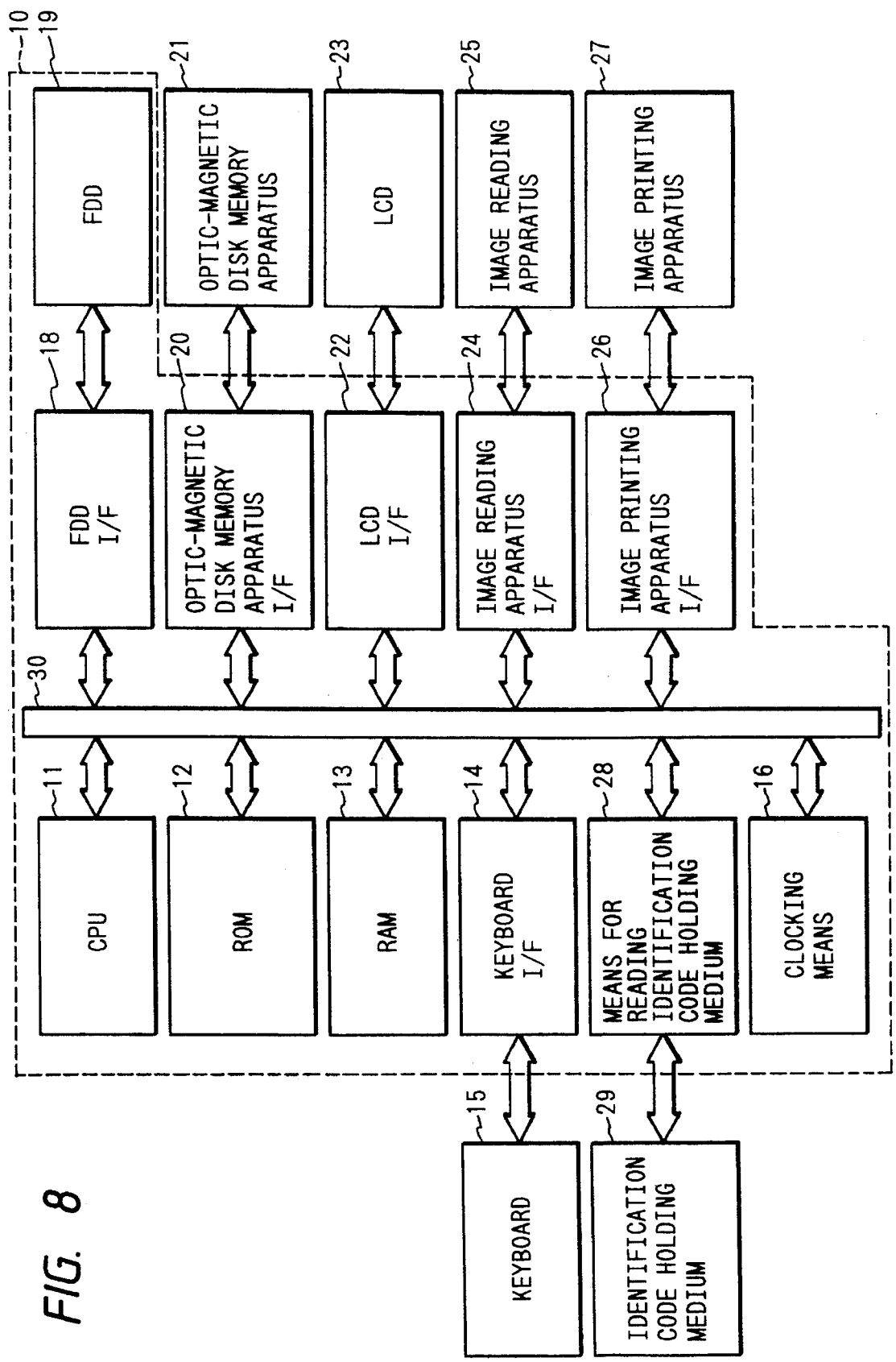
FIG. 8 is a block diagram showing the construction of a third embodiment of the data filing apparatus according to the invention.

FIG. 8 is a block diagram showing the construction of a third embodiment of the invention.

Figure 9:
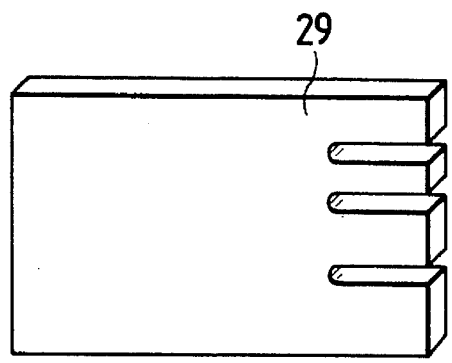
FIG. 9 is a plan view showing an identification code holding medium used in the same embodiment.

In this embodiment of image filing apparatus, identification code holding medium reading means 28 for reading identification codes from identification code holding medium 29 is provided in lieu of identification code setting means 17 in the preceding second embodiment. As identification code holding medium 29 may be used a card provided with slits representing an identification code, as shown in FIG. 9.

In this embodiment, like the preceding embodiment, data and time data at the time of image reading from clocking means 16 is stored together with apparatus identification code of identification code holding medium reading means 28 in an empty area of directory 4, as shown in FIG. 10.

Since in this embodiment image identification code contains identification code peculiar to identification code holding medium 29, even when images read out at identical times with different image filing apparatus are copied on a common image filing apparatus or image storing medium, both image data can be stored such that they are capable of independent retrieval from each other. In this case, directory 3 is managed in a manner as shown in FIG. 11.

Figure 11:
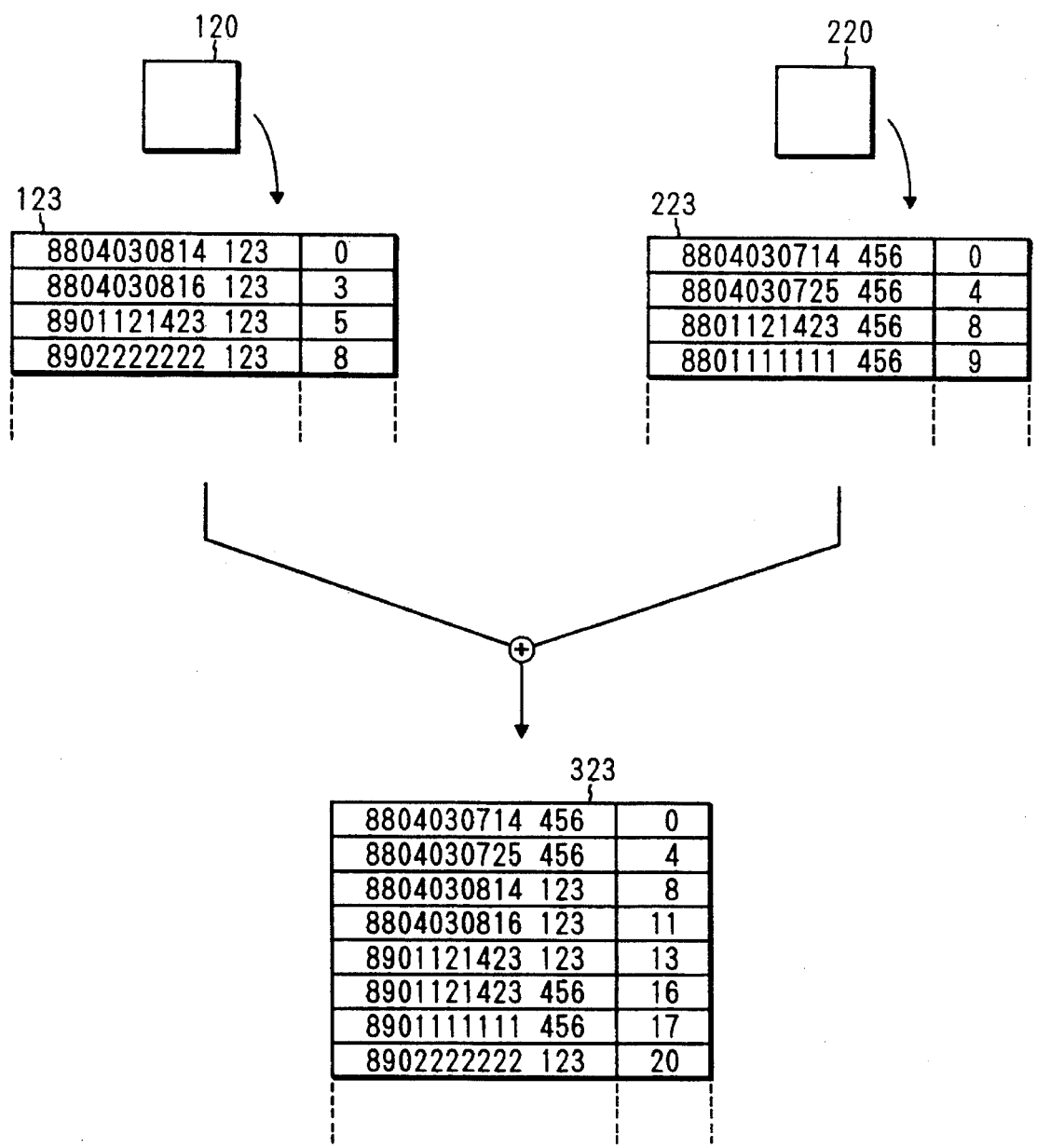
FIG. 11 is a schematic view showing a directory management system when copying data on more than one data storing medium in the same embodiment.

Referring to FIG. 11, directories 123 and 223 are for opto-magnetic disk data storing media 120 and 220 carrying stored data.

When copying the data on these two media on a common opto-magnetic disk medium, image identification data after copying and synthesis are synthesized and managed on directory 323 for a directory produced for a plurality of data storing media is provided with own image identification codes.

The other construction and operation are substantially the same as those of the previous embodiment.

Figure 12:
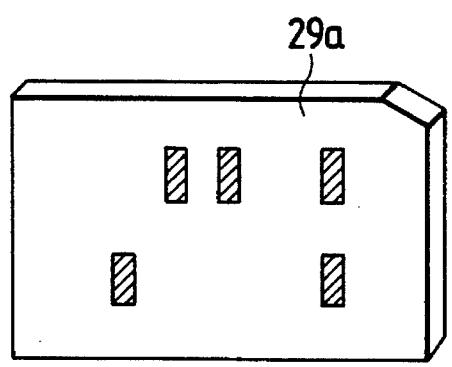
FIG. 12 is a plan view showing a different example of identification code holding medium.
Figure 13:
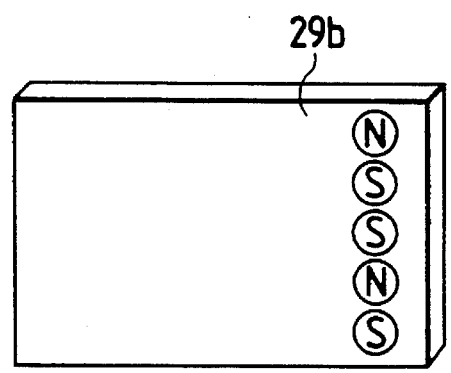
FIG. 13 is a plan view showing a further example of identification code holding medium.

The identification code holding medium may be of various forms. FIG. 12 shows a different example of the medium, which is card 29a provided with a mark representing an identification code. FIG. 13 shows a further example of the medium, which is a card or IC card with a magnetic zone representing an identification code.

Figure 14:
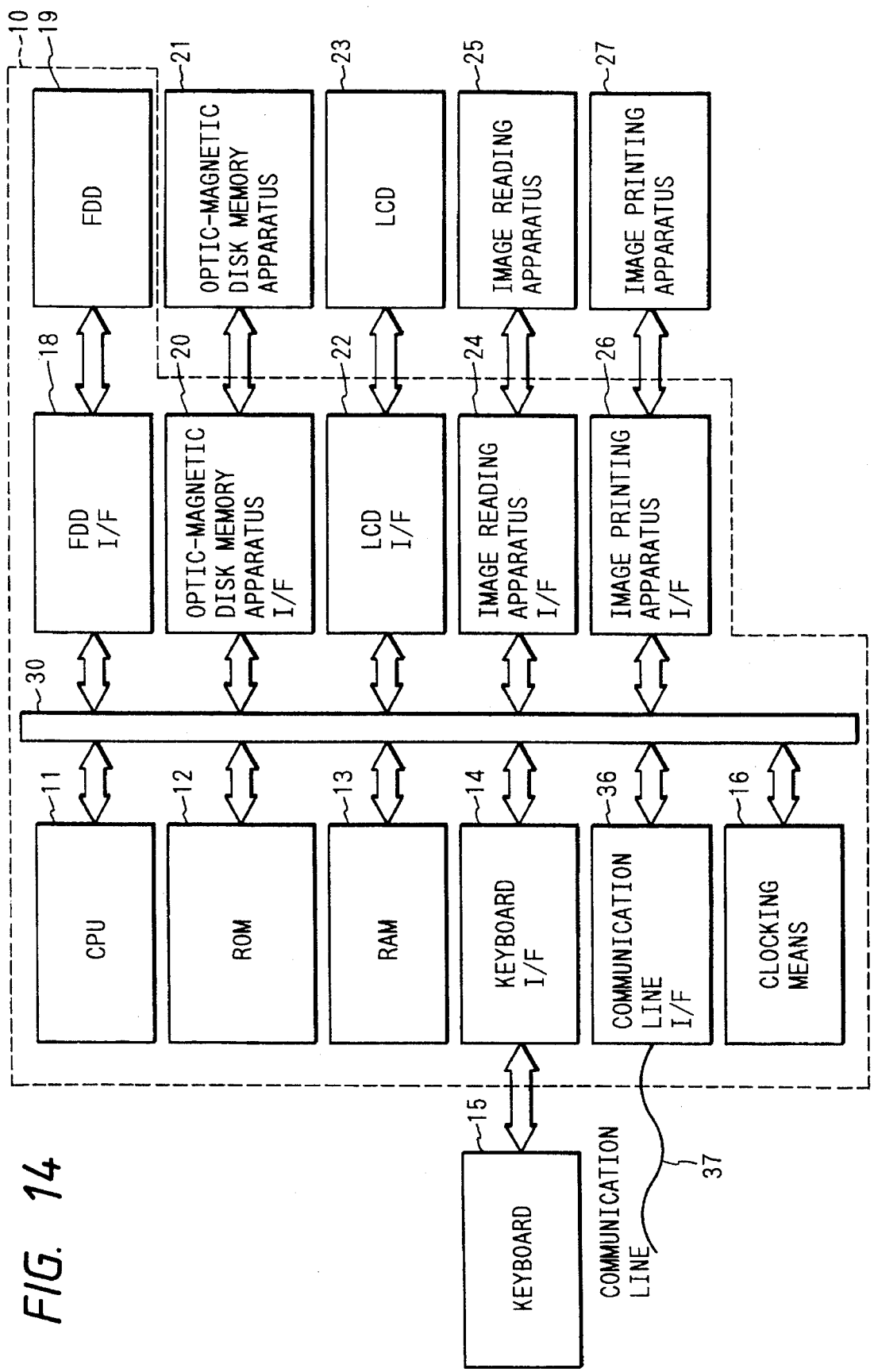
FIG. 14 is a block diagram showing the construction of a fourth embodiment of the data filing apparatus according to the invention.

FIG. 14 is a block diagram showing the construction of a fourth embodiment of the invention.

In this data filing apparatus, communication line interface 36 connecting communication line 37 and system bus 30 is provided for storing data received from the outside.

In this embodiment, received image read out by image reading means on transmitter side or retrieval image read out by image reading apparatus 25 of this apparatus is contracted to produce index image data which is stored. In addition, relative data representing a relation between index image data and data for retrieval is also produced and stored. By selecting index image data, data retrieval is executed according to relative data.

Figure 15:
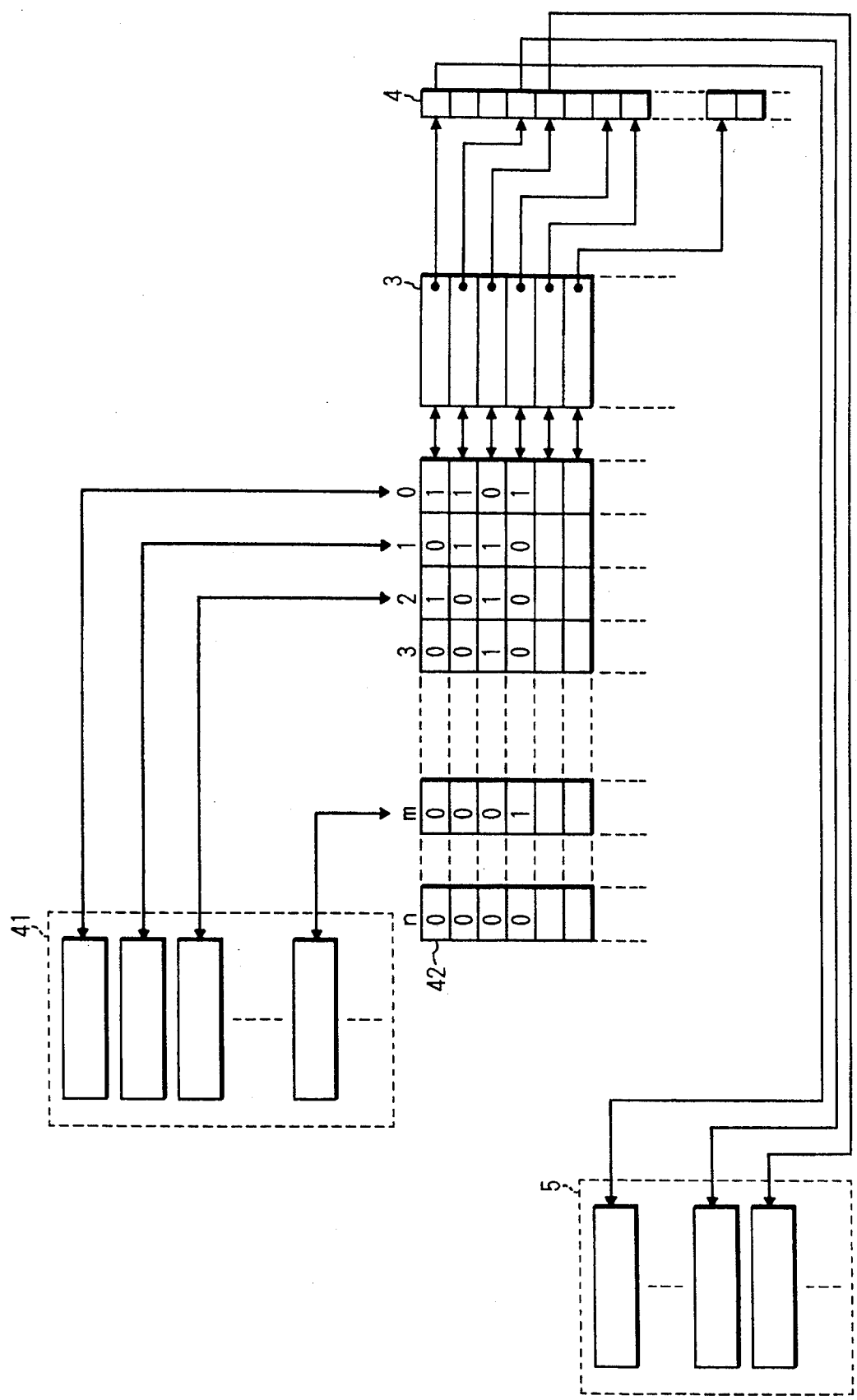
FIG. 15 is a schematic view showing memory area construction for data retrieval in the same embodiment.
Figure 16:
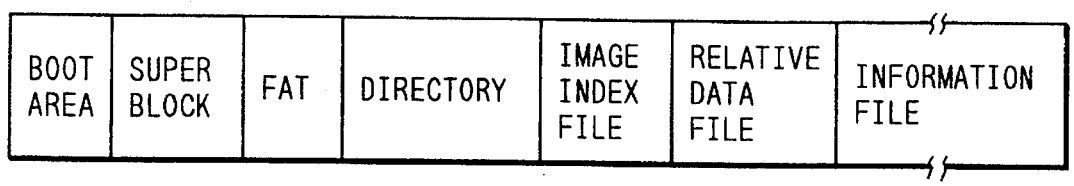
FIG. 16 is a schematic view showing data arrangement on a disk in the same embodiment.

In this embodiment, as shown in FIG. 15, index data file 41 storing index image data 1-0 to 1-m and relative data file 42 for producing and storing relative data noted above are provided as a stage preceding directory 3. On actual disk, data sequence as shown in FIG. 16 is stored.

Figure 17:
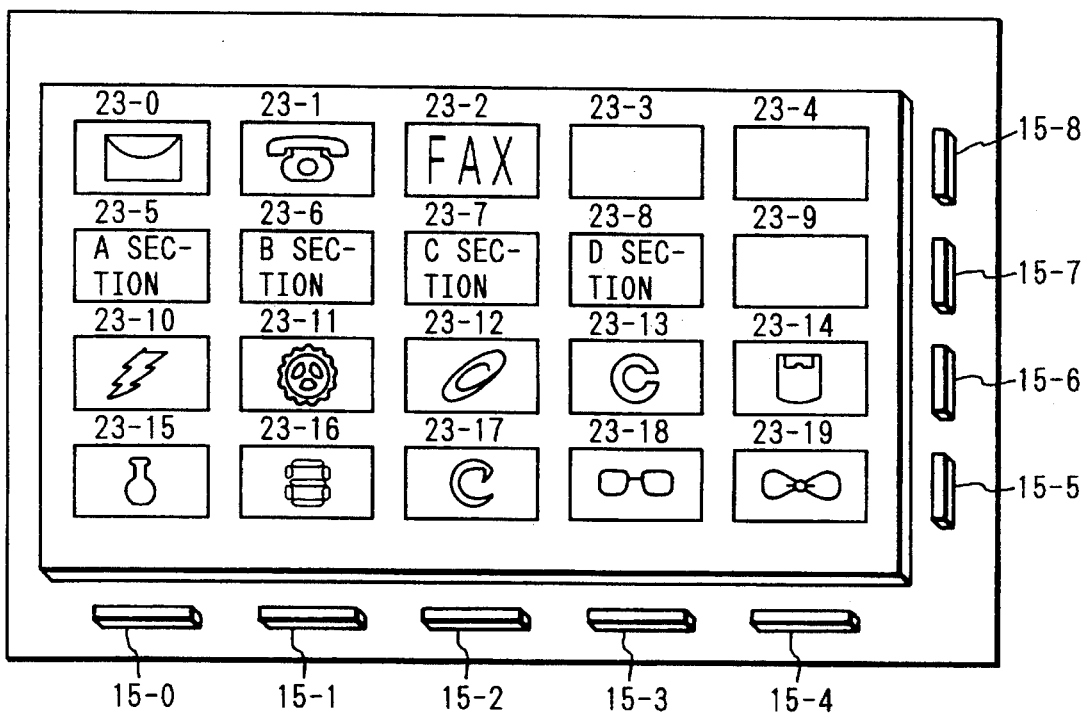
FIG. 17 is a front view showing a key arrangement of a keyboard in the same embodiment.

FIG. 17 illustrates the key array on keyboard 15.

In this embodiment, keys 15-0 to 15-8 are provided around liquid crystal display 23 for displaying index images 23-0 to 23-19 thereon. Individual index images 23-0 to 23-19 can be designated one by one by combinations of keys 15-0 to 15-4 arranged horizontally and keys 15-5 to 15-8 arranged vertically.

Now, a summary of the operation of this embodiment will be described. (1) Registration of index image After closure of the power source, the operator designates a retrieval index image registration mode from keyboard 15 and designates the position of display area for index image registration thereon with a combination of keys 15-0 to 15-4 and 15-5 to 15-8. Then an original carrying the index images is set on image reading apparatus 25.

CPU 11 detects through image reading apparatus interface circuit 24 that the original is set. Consequently, it provides a start signal to image reading apparatus 25 through image reading apparatus interface circuit 24 for reading of index image production image data into an image reading area of RAM 13. When storing received image data, the received image data is stored in the image reading area of RAM 13 before the registration.

The index image production image data which is read into the image reading area of RAM 13 is ordinary size image data. On the other hand, it is necessary to display a plurality of (practically 8 to 30) index images at a time on liquid crystal display 23. The number of pixels of the read-out image data and those of liquid crystal display 23 do not coincide.

To overcome this three methods are conceivable; (1) the original image is contracted for reading by limiting area, (2) the index image data is made ordinary size image data and contracted when displayed, and (3) ordinary size image data is contracted as index image.

In the method in (1), a small size original has to be produced, which is difficult. In addition, alignment at the time of reading is difficult. In the method in (2) the index image can be read quickly. However, its data amount is large, thus increasing the occupied area of the data filing apparatus. Besides, time for contracting process is necessary when displaying the index image.

Accordingly, in this embodiment the method in (3) is adopted to produce index image.

More specifically, according to a program stored in ROM 12 CPU 11 selects bits corresponding to a given contraction factor among the bits corresponding to the pixels of image data on RAM 13 and copies the image in a contracted scale in the index image area of RAM 13. This bit reduction is to produce index image by selecting one pixel for every 5 pixels in case when the contraction factor is ⅕. This is done in both vertical and horizontal directions of the image.

In the above way, index image is produced in the index image area of RAM 13.

Subsequently, CPU 11 displays the index image data in RAM 13 on a designated area of liquid crystal display 23, while also storing this index image data in an index image file area of opto-magnetic disk memory apparatus 21 through opto-magnetic disk memory apparatus interface circuit 20.

In this way, desired index images are registered one after another.

(2) Storing of data to be registered

Subsequently, the operator instructs CPU 11 to read in image data to be registered from the keyboard and sets-original image-on image reading apparatus 25.

CPU 11 detects, through image reading apparatus interface circuit 24, that the original is set. In consequence, it-starts image reading apparatus 25 through image reading apparatus interface circuit 24 for reading image data into RAM 13. In addition, for confirmation of exposing, CPU 11 displays image data in RAM 13 on liquid crystal display 23. Further, CPU 11 stores image data in an empty data file area of opto-magnetic disk memory apparatus 21 through opto-magnetic disk memory apparatus interface circuit 20.

(3) Addition of index

Subsequently, the operator adds index to image data stored in opto-magnetic disk memory apparatus 21 in the following way.

Figure 18:
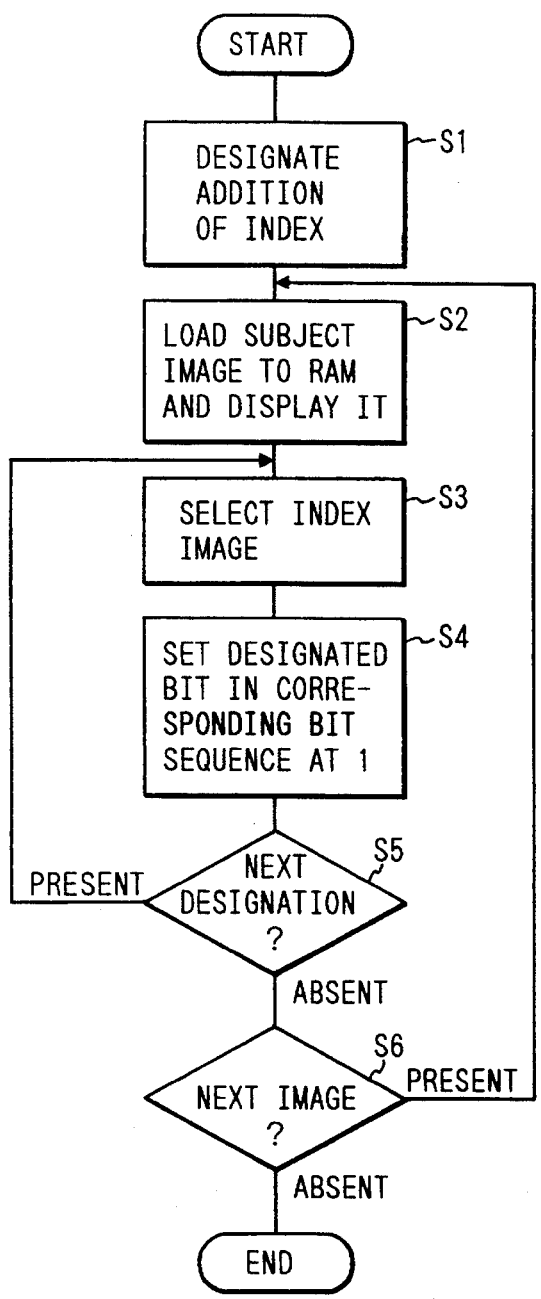
FIG. 18 is a flow chart illustrating an operation of index addition in the same embodiment.

FIG. 18 is a flow chart illustrating operation when adding index.

When the operator designates addition of index with keyboard 15 (step S1), CPU 11 loads subject image with index to be added thereto in RAM 13 from the data file area of opto-magnetic disk memory apparatus 21 and displays it on liquid crystal display 23 (step S2).

Then, the operator selects index image corresponding to the contents displayed on liquid crystal display 23 in terms of a combination of keys 15-0 to 15-4 and 15-5 to 15-8 (step S3).

CPU 11 then sets a designated bit position in bit sequence corresponding to subject image of index addition in relative data area to "1" (step S4).

The above sequence of operations is repeated (step S5), whereby relative data consisting of a combination of "0"s and "1"s is produced in the bit sequence corresponding to the called image data among bit sequences 0 to n in the relative data file.

When relative data corresponding to image data is produced, the routine goes back to step S2 for index addition to next image data (step S6). The above sequence of operations is repeatedly executed for all image data to complete the index addition.

The relative data is managed by CPU 11 such that data in RAM 13 and data in opto-magnetic disk memory apparatus 21 or floppy disk memory apparatus 19 are of the same contents.

(4) Retrieval procedure

Figure 19:
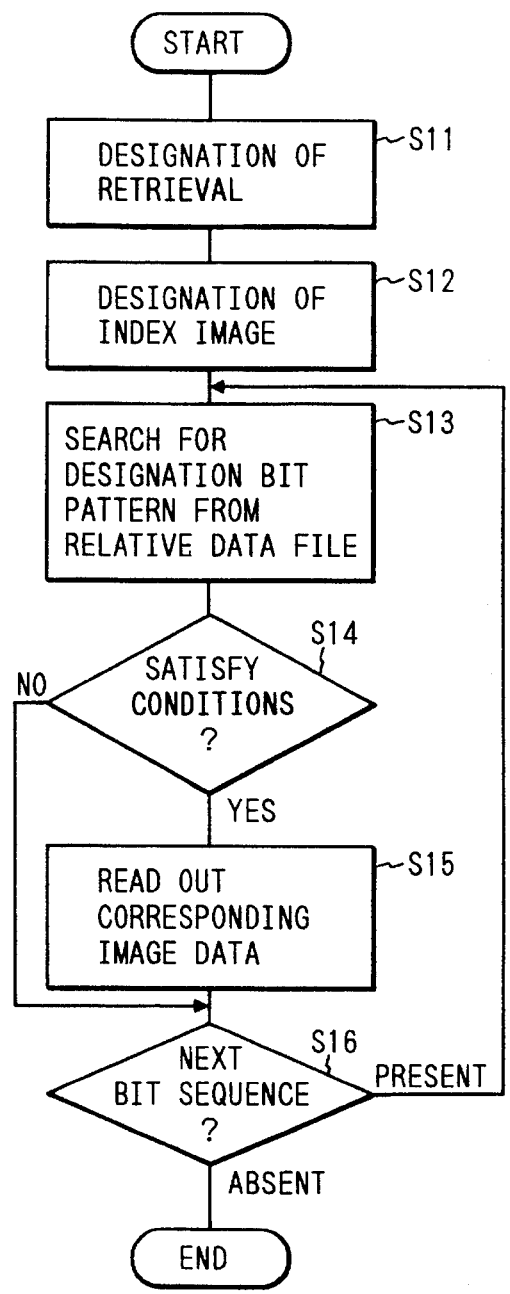
FIG. 19 is a flow chart illustrating an operation of retrieval of images in an opto-magnetic disk memory apparatus in the same embodiment.

FIG. 19 is a flow chart illustrating operation of retrieval of data,in opto-magnetic disk memory apparatus 21.

In the retrieval of data that has been subjected to index addition as described above, the operator first designates a retrieval mode from keyboard 15 (step S11) land then designates index image related to image for retrieval among a plurality of index images displayed on liquid crystal display 23 in terms of a combination of keys 15-0 to 15-4 and 15-5 to 15-8 (step S12). It is possible to designate a plurality of index images at a time. Further, when the opto-magnetic disk is set, index image is transferred therefrom to RAM 13.

Then, CPU 11 searches the relative data file for bit pattern of bit position specified by designated index data for each bit sequence (step S13). When a pertaining bit pattern is found, image data corresponding to that bit sequence satisfies a retrieval condition (step S14). Thus, CPU 11 reads out corresponding image data from opto-magnetic disk memory apparatus 21 and loads it in RAM 13 (step S15). If there is no pertaining bit pattern, after searching all the bit sequences, CPU 11 displays a message indicative of absence of pertaining image, thus bringing an end to the process (step S16).

If there are a plurality of image data satisfying the retrieval condition, there is no problem. In this case, sequential image display may be executed, or alternatively the number of list of pertaining images may be displayed.

As has been shown, with this embodiment at the time of registration of index image an original of index image may be produced with a large drawing or character which can be easily drawn by the operator, and index image may be read without paying particular conditions to the reading position, thus permitting operability improvement.

Further, while in this embodiment image data for retrieval is stored prior to the storing of retrieval data, converse storing is also possible.

Further, while in this embodiment stored data is displayed for selecting index image corresponding to the displayed data, it is also possible to let index image to be selected at the time of storing.

Further, while in this embodiment image contraction is executed at the time of registration of index image, this is not necessary; for instance index image may be formed by trimming part of original image.

Further, while this embodiment concerns image data as retrieval data, this is by no means limitative, and the invention covers various kinds of data and registration routes thereof such as code data from communication lines, compressed image data and code data on floppy disks.

Further, the data arrangement on the data storing medium in this embodiment is only a theoretical model for the sake of explanation and is by no means limitative. In addition, there is no need of storing image data, relative data and retrieval data on the same data storing medium, and these data may be stored distributedly on a plurality of media as well.

Further, while in this embodiment switches for designating rows and columns are provided for permitting selection of index image, it is also possible to use a touch panel mounted in liquid crystal display, or designation may be effected on the basis of a number input from numeric keys.

Figure 20:
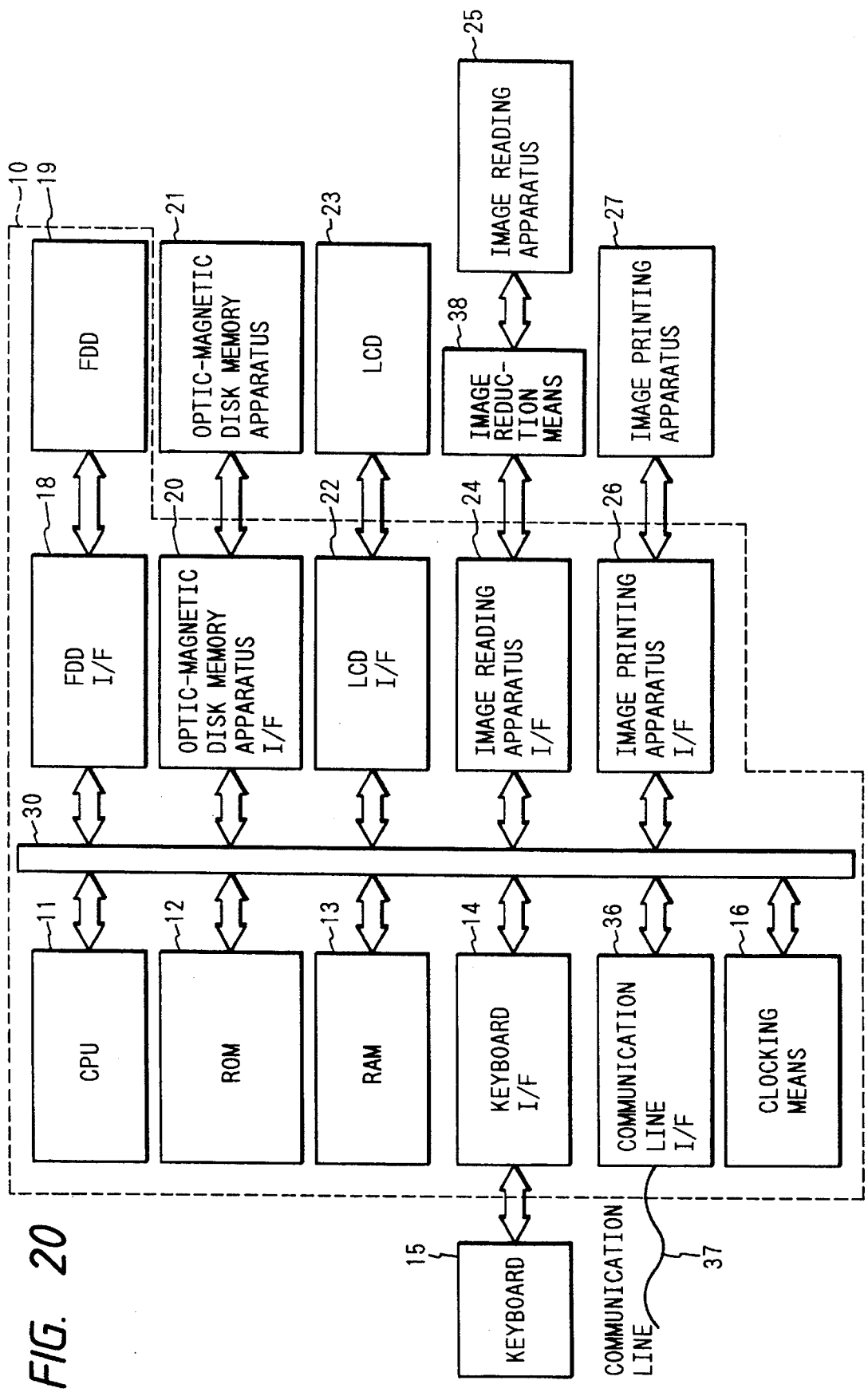
FIG. 20 is a block diagram showing a fifth embodiment of the data filing apparatus according to the invention.

FIG. 20 is a block diagram showing a fifth embodiment of the invention.

In this embodiment, image contraction means 38 is provided between image reading apparatus 25 and image reading apparatus interface circuit 24. Image contraction means 38 effects image contraction when index image is read out, and it includes a resister, a counter, and an AND gate and an OR gate.

Figure 21:
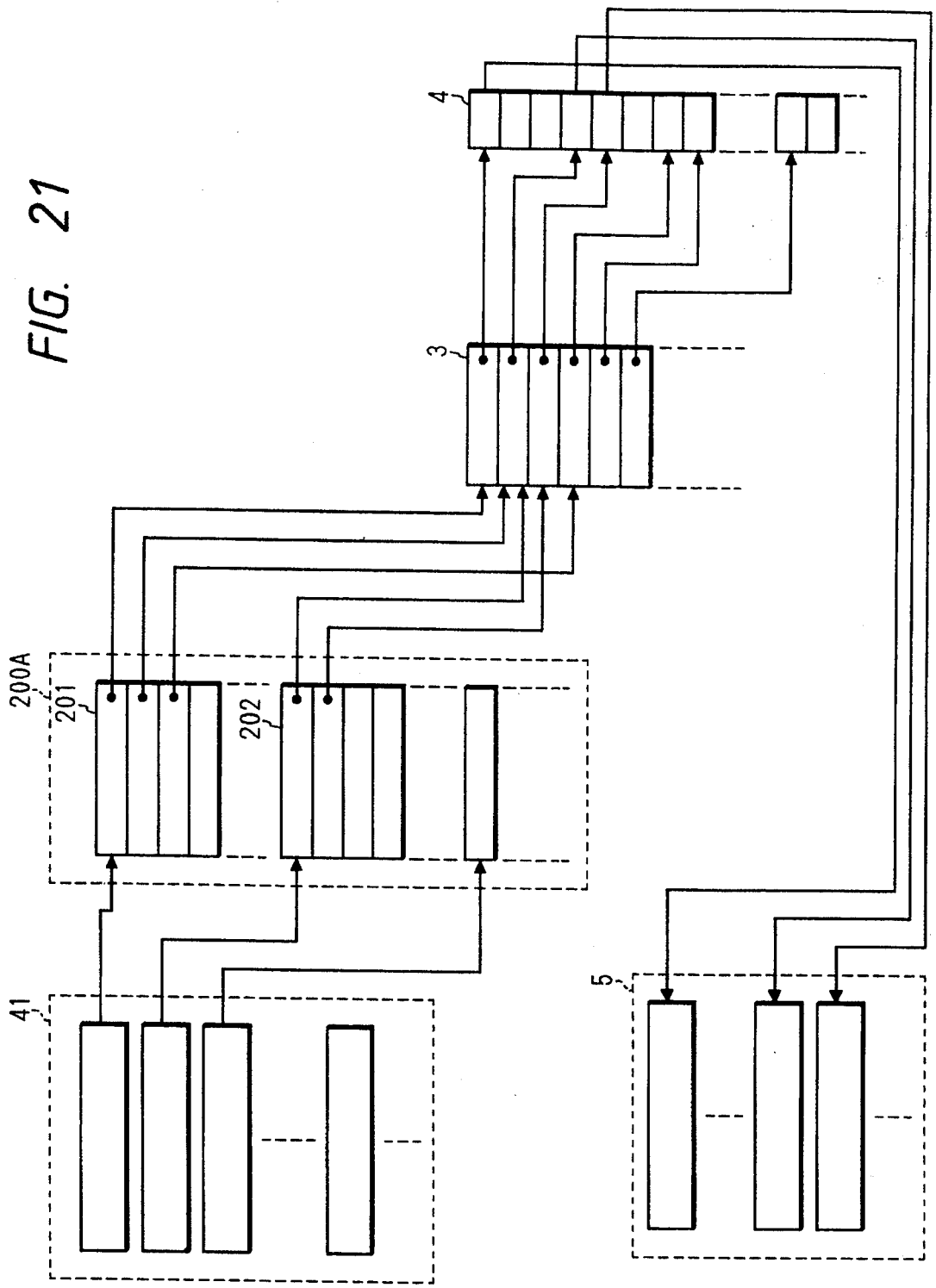
FIG. 21 is a schematic view showing memory area construction for data retrieval in the same embodiment.

Further, relative data file 200A of this embodiment, as shown in FIG. 21, has pointer areas 201, 202, . . . corresponding to the respective index images.

In the operation of index image registration in this embodiment, when CPU 11 detects that original is set in image reading apparatus 25 by the operator, it renders image contraction means 38 operative and then starts image reading apparatus 25 to supply image data to image contraction means 38. Image contraction means 38 contracts input image data with a predetermined contraction factor to produce index image data, which is supplied to image reading apparatus interface circuit 24. The image contraction is effected by removing one pixel for every five pixels in one of every five main scanning lines in case when the contraction factor is ⅕.

Subsequently, index image is displayed and stored in the manner as described before in connection with the fourth embodiment.

Further, retrieval data is stored in the manner as in the fourth embodiment. In the index addition operation of this embodiment, when index image of retrieval image is designated by a combination of keys 15-0 to 15-4 and 15-5 to 15-8, CPU 11 sets a pointer of the image to the directory in a pointer area of relative data file 200A corresponding to the designated index image.

The retrieval is carried out in the manner as in the fourth embodiment.

In this embodiment, any data which absolutely corresponds to the file name of the like of data of selected index image.

Figure 22:
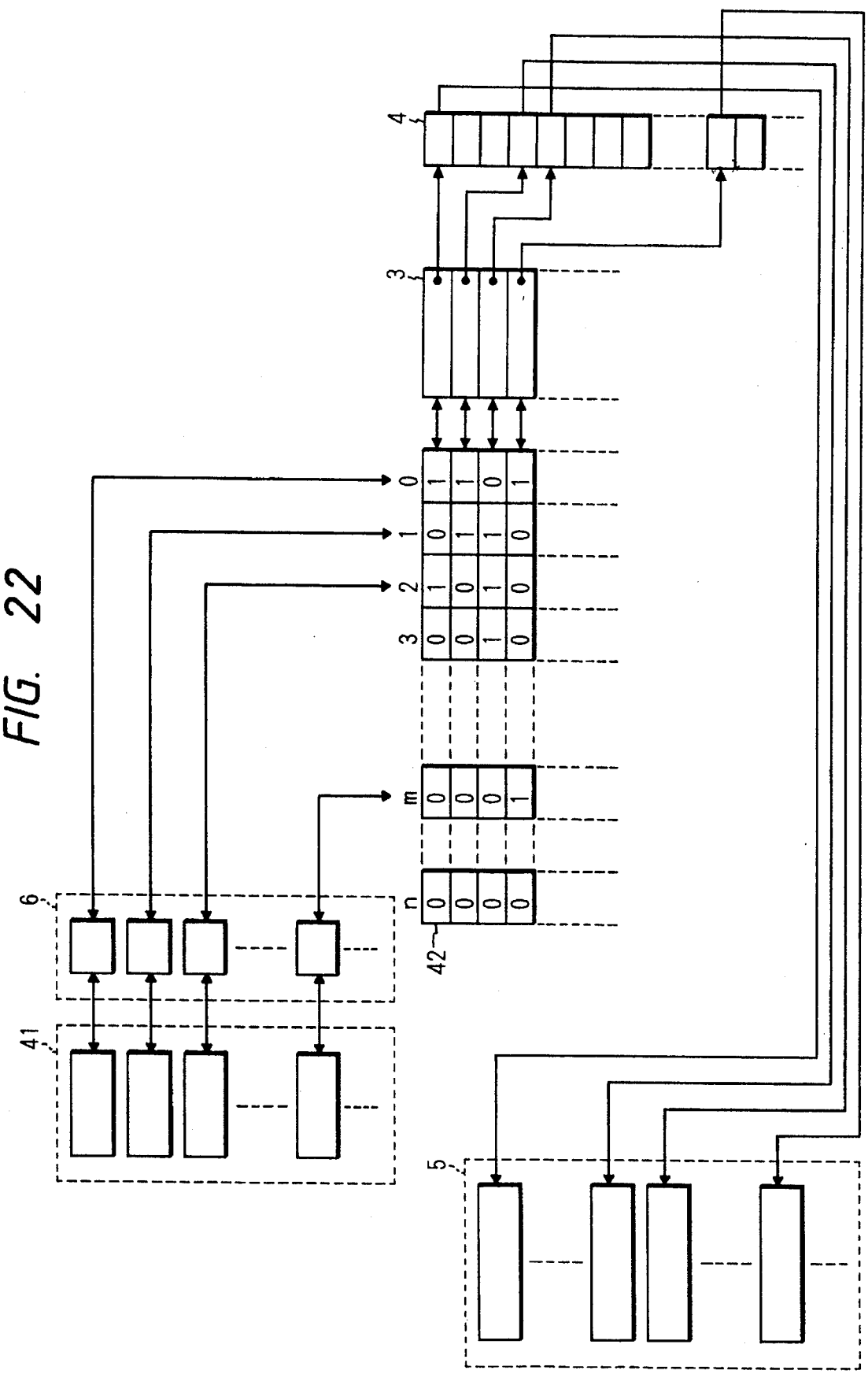
FIG. 22 is a schematic view showing memory area construction for data retrieval in a sixth embodiment of the data filing apparatus according to the invention.

FIG. 22 is a schematic view showing the memory area construction for data retrieval in a sixth embodiment of the invention.

In this data filing apparatus, index data identification data area 6 is provided between index image data file 41 and relative data file 42 shown in FIG. 15. For the rest, this data filing apparatus is the same as that shown in FIG. 1. Meanwhile, this apparatus is provided with the same keyboard as shown in FIG. 17.

When registering index image with this data filing apparatus, index image is stored in index image file area of opto-magnetic disk memory apparatus 21 in the same procedure as in the fourth embodiment described before in connection with FIG. 15.

When reading this index data, CPU 11 receives data and time data of present data and time from clocking means 16, and it stores this data as index image identification data in an address of index image identification data area 6 of opto-magnetic disk memory apparatus 21 that corresponds to the index image stored this time. FIG. 23 is a schematic view showing a specific example of index image identification data area 6.

The storing of retrieval data, addition of index and retrieval are performed in the same manner as in the fourth embodiment.

In the copying of data on more than one data storing medium, index data is managed as follows.

Figure 24:
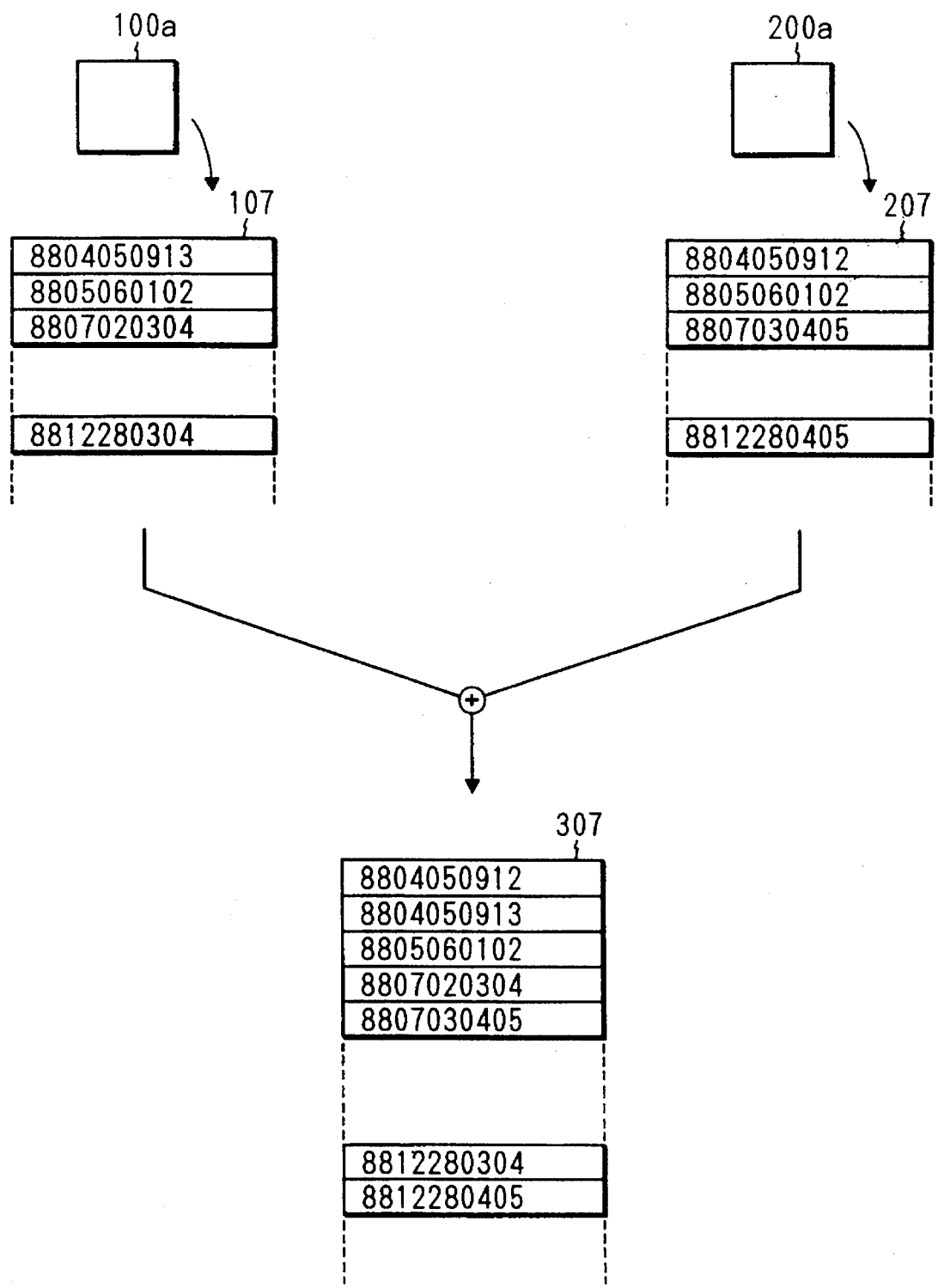
FIG. 24 is a schematic view showing a directory management system when copying data on more than one data storing medium in the same embodiment.

Referring to FIG. 24, directories 107 and 207 are for opto-magnetic disk data storing media 100a and 200a carrying stored data.

When copying the data on these two media on a common opto-magnetic disk medium, image identification data after copying and synthesis are synthesized and managed on directory 307 for a directory produced for a plurality of data storing media is provided with own image identification codes.

Figure 25:
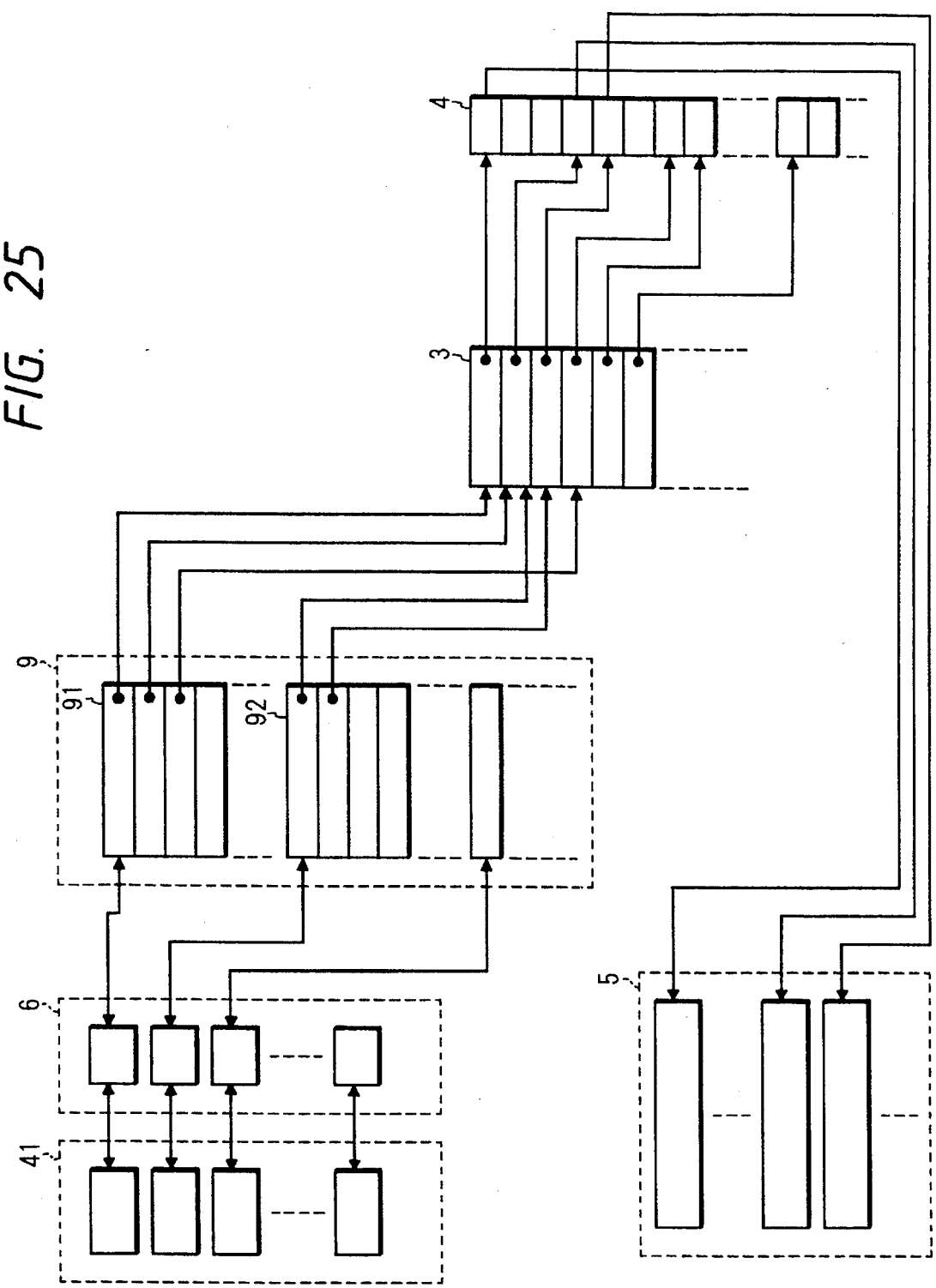
FIG. 25 is a schematic view showing memory area construction for data retrieval in a seventh embodiment of the data filing apparatus according to the invention.

FIG. 25 is a schematic view showing the memory area construction for data retrieval in a seventh embodiment of the invention.

In this data filing apparatus, relative data file 9 having pointer areas 91, 92, . . . corresponding to the respective index data identification data is provided in lieu of relative data file 41 shown in FIG. 22. For the rest, this data filing apparatus is the same as that shown in FIG. 5. Meanwhile, again this data filing apparatus is provided with the same keyboard as shown in FIG. 17.

In this data filing apparatus, registration of index data, storing of retrieval data and retrieval are performed in the same manner as in the sixth embodiment.

Further, in the index addition operation of this embodiment, when index image of retrieval image is designated by keys 15-0 to 15-8, CPU 11 sets a pointer of the image to the directory in a pointer area of relative data file 9 that corresponds to the designated index image.

FIG. 26 is a schematic view showing a specific example of index image identification data area 6.

In the copying of data on more than one data storing medium, index data is managed as follows.

Figure 27:
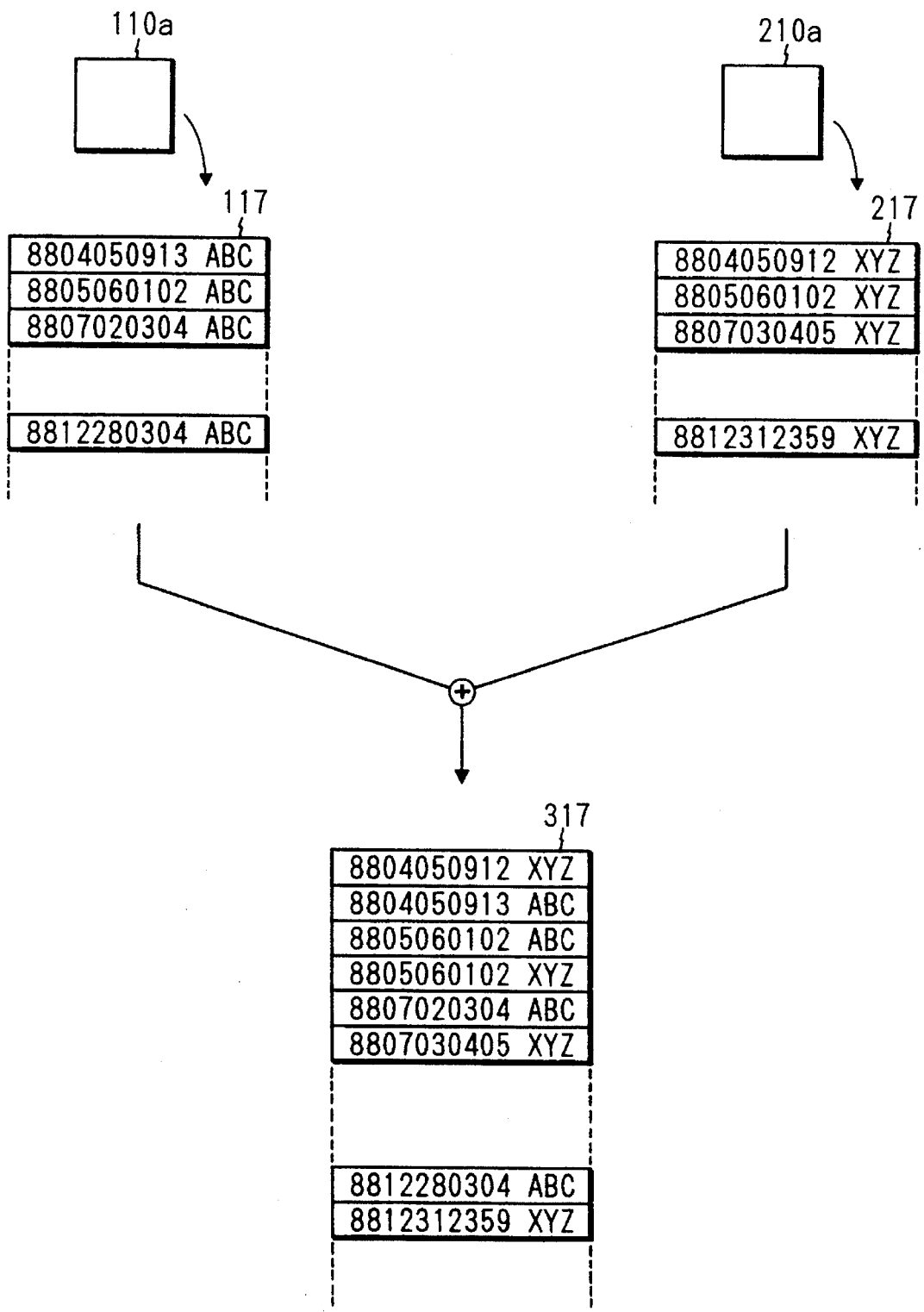
FIG. 27 is a schematic view showing a directory management system when copying data on more than one data storing medium in the same embodiment.

Referring to FIG. 27, directories 117 and 217 are for opto-magnetic disk data storing media 110a and 210a carrying stored data.

When copying the data on these two media on a common opto-magnetic disk medium, image identification data after copying and synthesis are synthesized and managed on directory 317 for a directory produced for a plurality of data storing media is provided with own image identification codes.

As has been shown, in the above fourth and following embodiments it is possible to obtain designation of a character of retrieval data based on image, and thus retrieval operation can be executed under the sense of the operator. In addition, the operator can easily register index data, thus facilitating the management of the retrieval apparatus and permitting a retrieval system based on the operators creative sense to be readily built. Further, it is possible to reduce memory for storing the relation between index data and retrieval data, thereby greatly improving the retrieval speed.

Now, the operation at the tire of retrieval will be described by using display screen.

Figure 28:
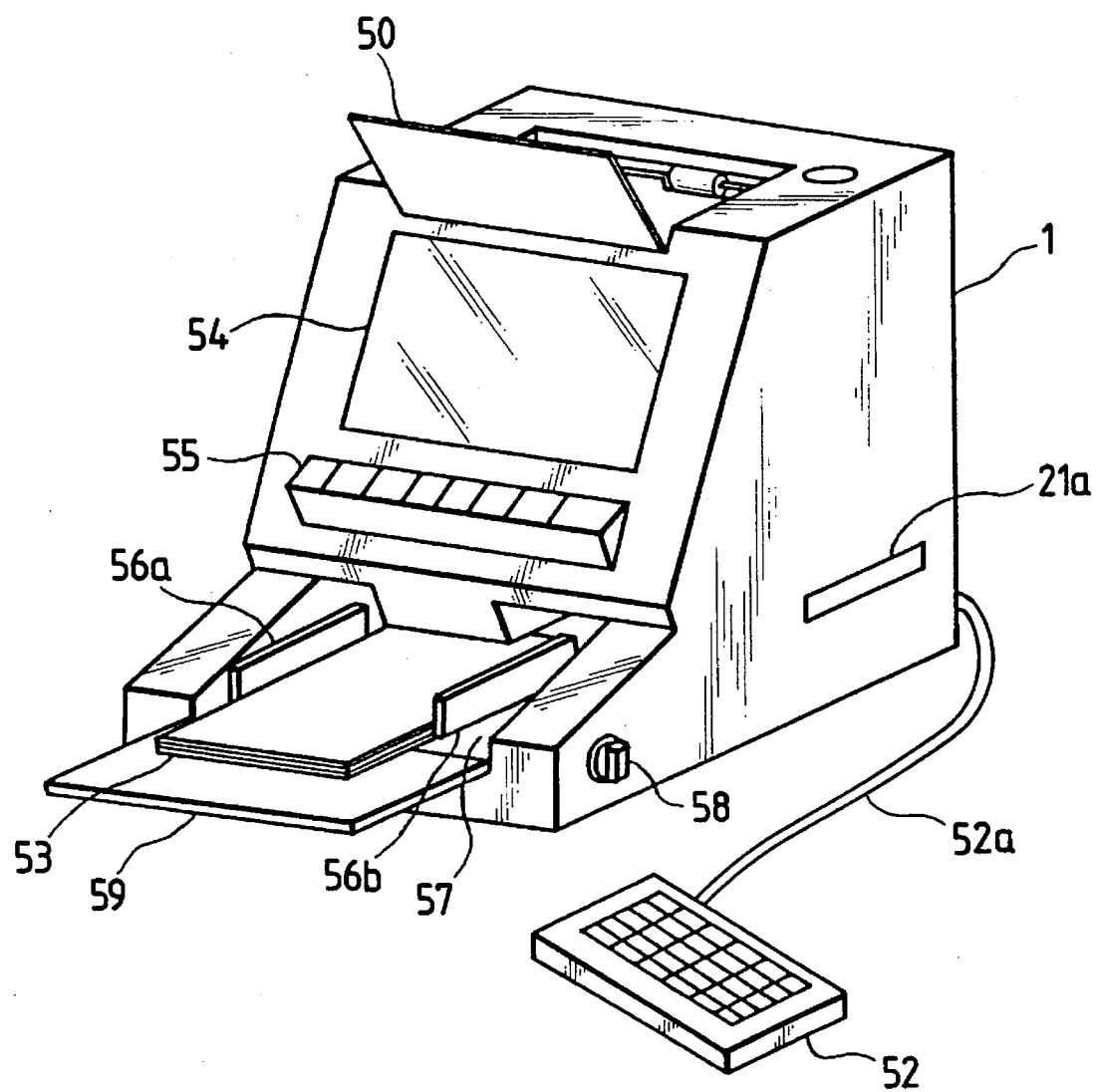
FIG. 28 is a perspective view showing an electronic data filing apparatus, to which the invention is applicable.

FIG. 28 is a perspective view showing an embodiment of the invention.

This embodiment comprises keyboard 52 for providing operation commands to control electronic data filing apparatus 1 and receiving character and numeral data, signal line 52a connecting electronic data filing apparatus 1 and keyboard 52, plate-like display 54 such as an electroluminescence, plasma or fluorescent display tube, key group 5, side plates 56a and 56b provided on original table 7 for transveral displacement relative thereto to restrict original 53 in transversal directions, switch knob 58 for switching between automatic feeding of a plurality of originals 53 and one-by-one manual feeding of originals, tray 59 for supporting originals 53 and discharging tray 50.

Figure 29:
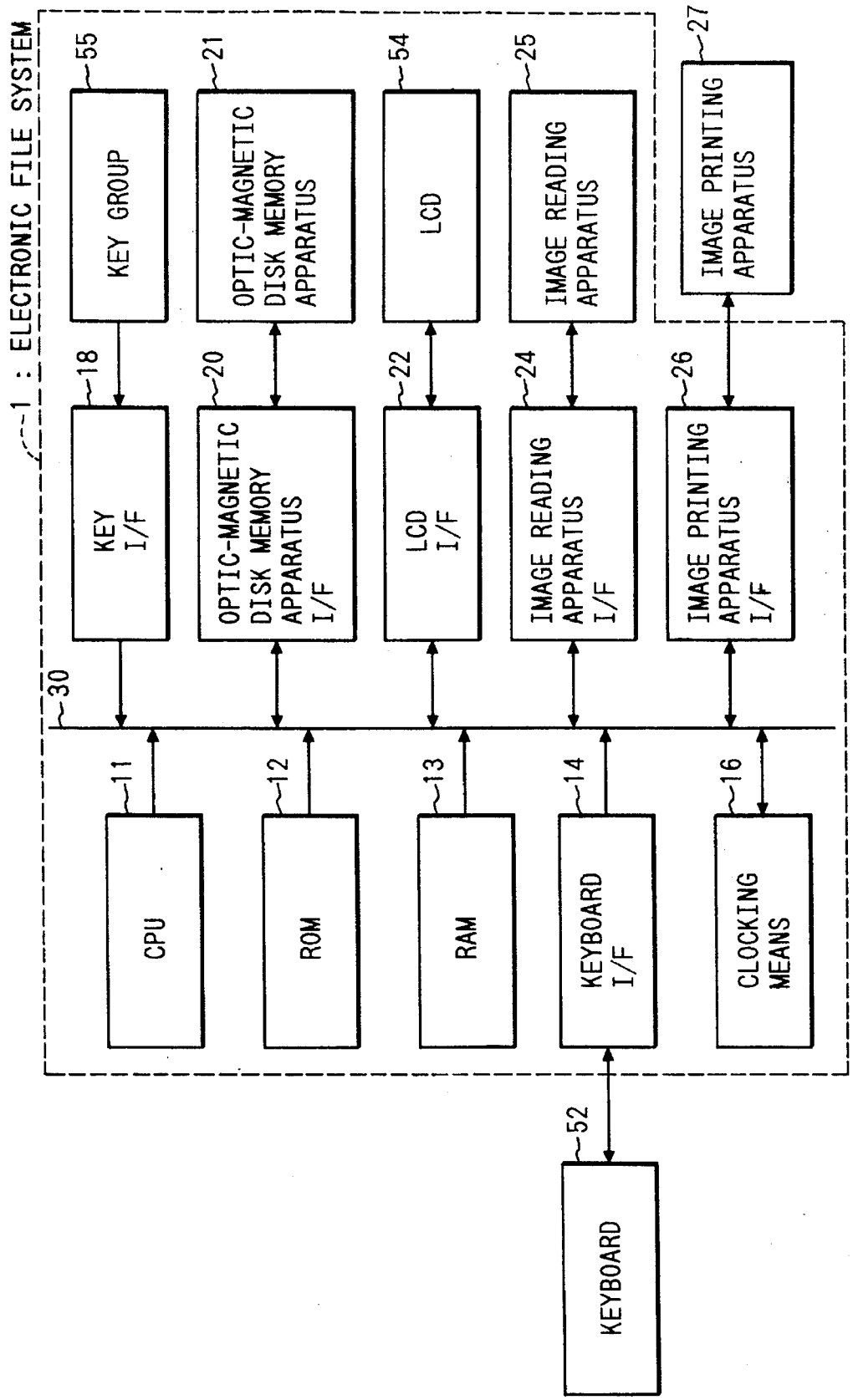
FIG. 29 is a block diagram showing the construction of an electronic data filing apparatus of the same embodiment.

FIG. 29 is a block diagram showing mainly the inner construction of electronic filing apparatus 1 in this embodiment.

Electronic filing apparatus 1 includes CPU 11 for controlling entire electronic filing apparatus 1, ROM 12 in which programs for the flow charts shown in FIGS. 31 to 34 are stored, RAM 13 used as work memory or the like, keyboard interface 14 for keyboard 52, clocking means 16 for counting date and time, key interface 18 for key group 55, opto-magnetic disk memory apparatus 21 for storing image data or the like on an opto-magnetic disk, opto-magnetic disk memory apparatus interface 20, an LCD as an example of display 54, LCD interface 22, image reading apparatus 25, image reading apparatus interface 24 and printing apparatus interface 26. Electronic filing apparatus 1 is connected to keyboard 52 and-image printing apparatus 27.

Now the operation of this embodiment will be described.

Figures 1, 30:
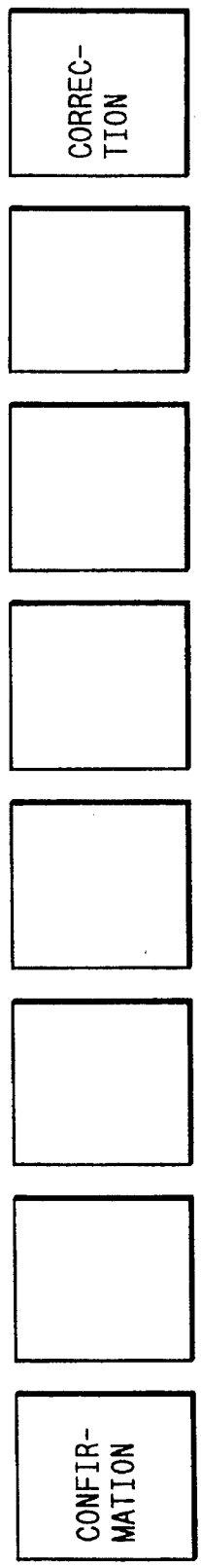

FIGS. 30-1 to 30-5 are views showing examples of display on display 54 in different states of the embodiment.

When the power source of electronic filing apparatus 1 is closed, a display as shown in FIG. 30-1 takes place. When the present date is confirmed (i.e., when key K1 in key group 55 is depressed), a display as shown in FIG. 30-2 takes place. When disk is set in this state, initial image display is caused, as shown in FIG. 30-3. For correcting the date, key K8 in key group 55 is depressed in the state shown in FIG. 30-1, and the date is corrected by operating keyboard 2.

It is assumed that the present date and time is displayed in the initial display in an upper portion thereof and stamps K(1, 1) to K(4, 5) are already displayed. In this embodiment, by the term "stamp" is meant a retrieval image representing retrieval data, and a plurality of stamps are provided as retrieval data to one image.

Subsequently, by depressing key K2 corresponding to a retrieval mode, a retrieval mode display as shown in FIG. 30-4 is produced. Then by executing stamp selection in a manner to be described later, a retrieval list as shown in FIG. 30-5 is displayed on display 54.

Figure 31:
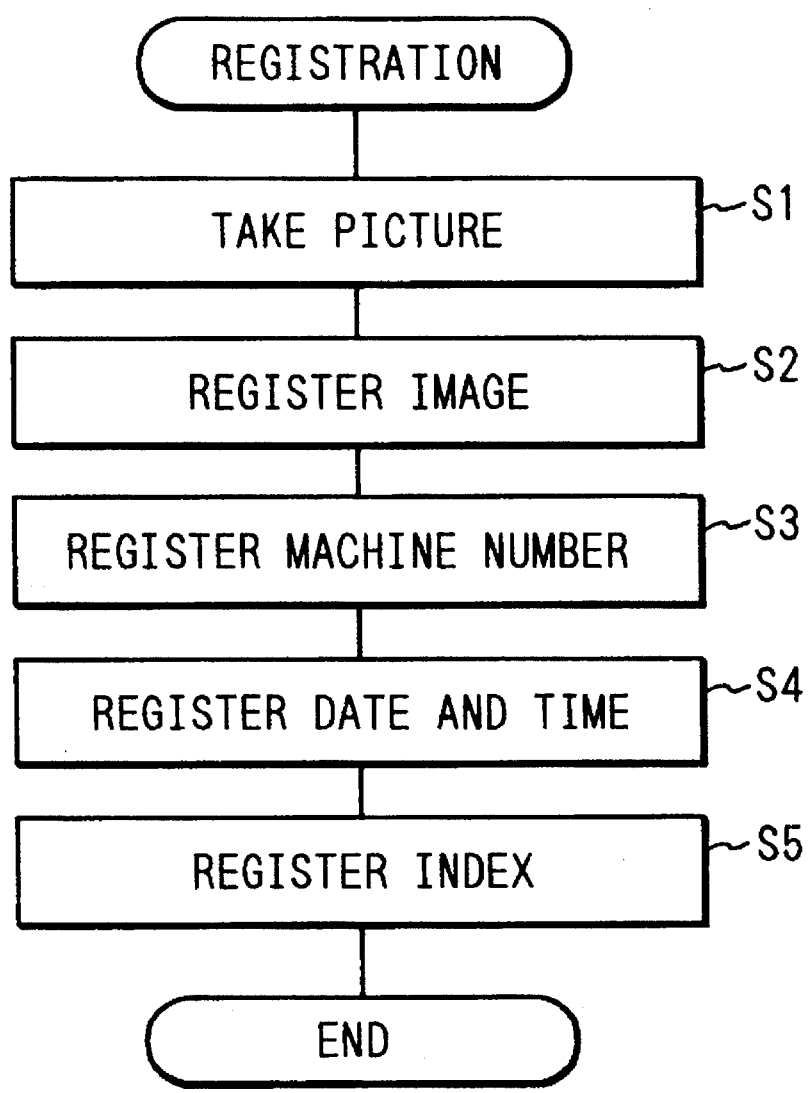
FIG. 31 is a flow chart illustrating a basic operation of registration in the same embodiment.

FIG. 31 is a flow chart illustrating an operation of registering original 53 in electronic data filing apparatus 1. As is shown, originals 53 are exposed one by one for taking their pictures by image reading apparatus 25 (step S1), and resultant images obtained are registered on disk (step S2). Then, machine number of electronic filing apparatus 1 (apparatus identification code), date and time of exposure and file index (including stamps) are registered (steps S3 to S5). Actually, image, machine number, data and time and index are registered substantially simultaneously.

Now, the operation of selecting retrieval data will be described.

Figure 32:
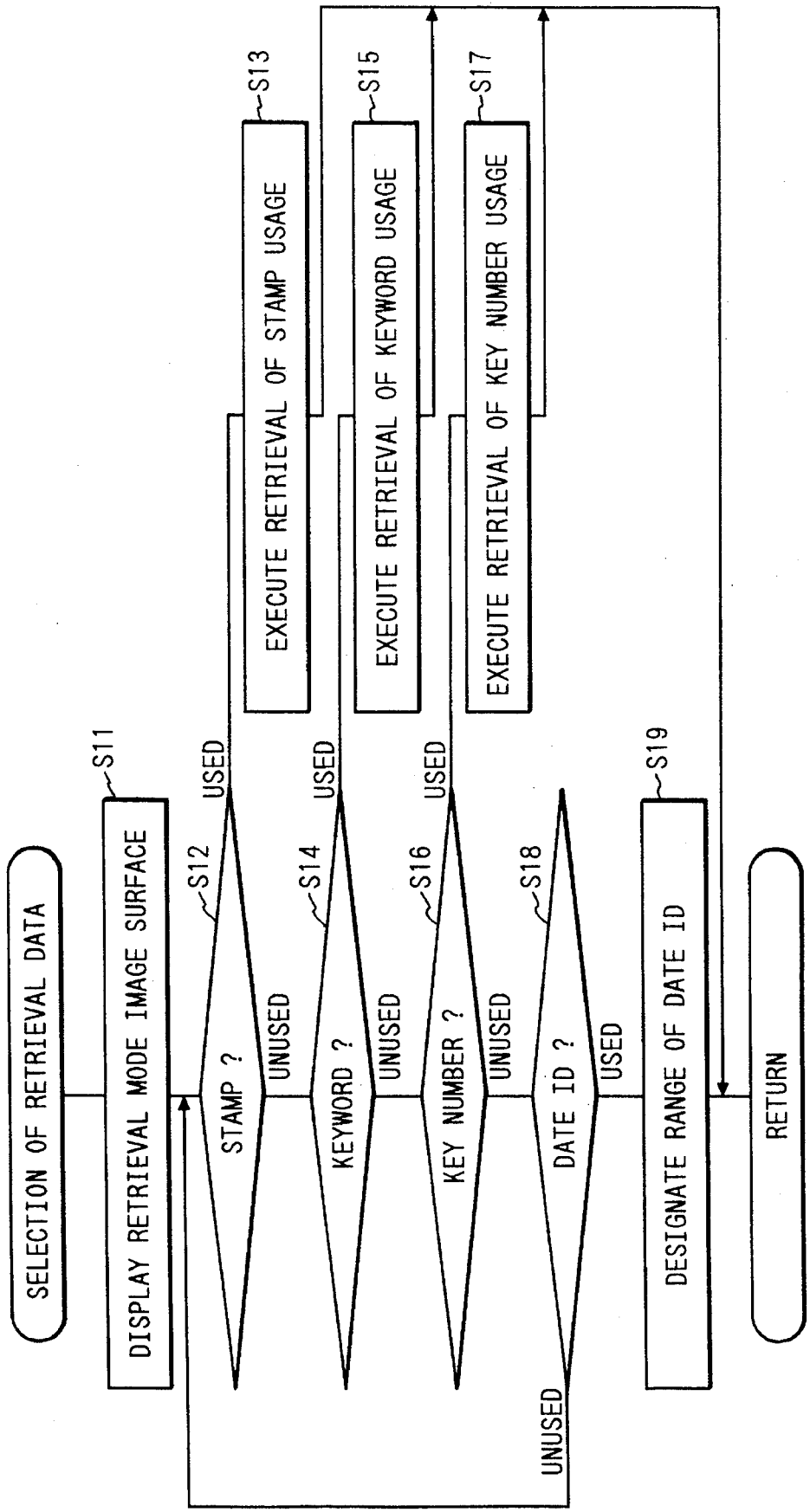
FIG. 32 is a flow chart illustrating an operation of retrieval data selection in the same embodiment.

FIG. 32 is a flow chart illustrating the operation of selecting retrieval data in this embodiment.

First, in the state of initial display shown in FIG. 30-1, retrieval mode key K2 is depressed to provide retrieval mode display as shown in FIG. 30-4 (step S11), for confirming usage of stamp, keyword, key number or date ID as retrieval data.

Figure 33:
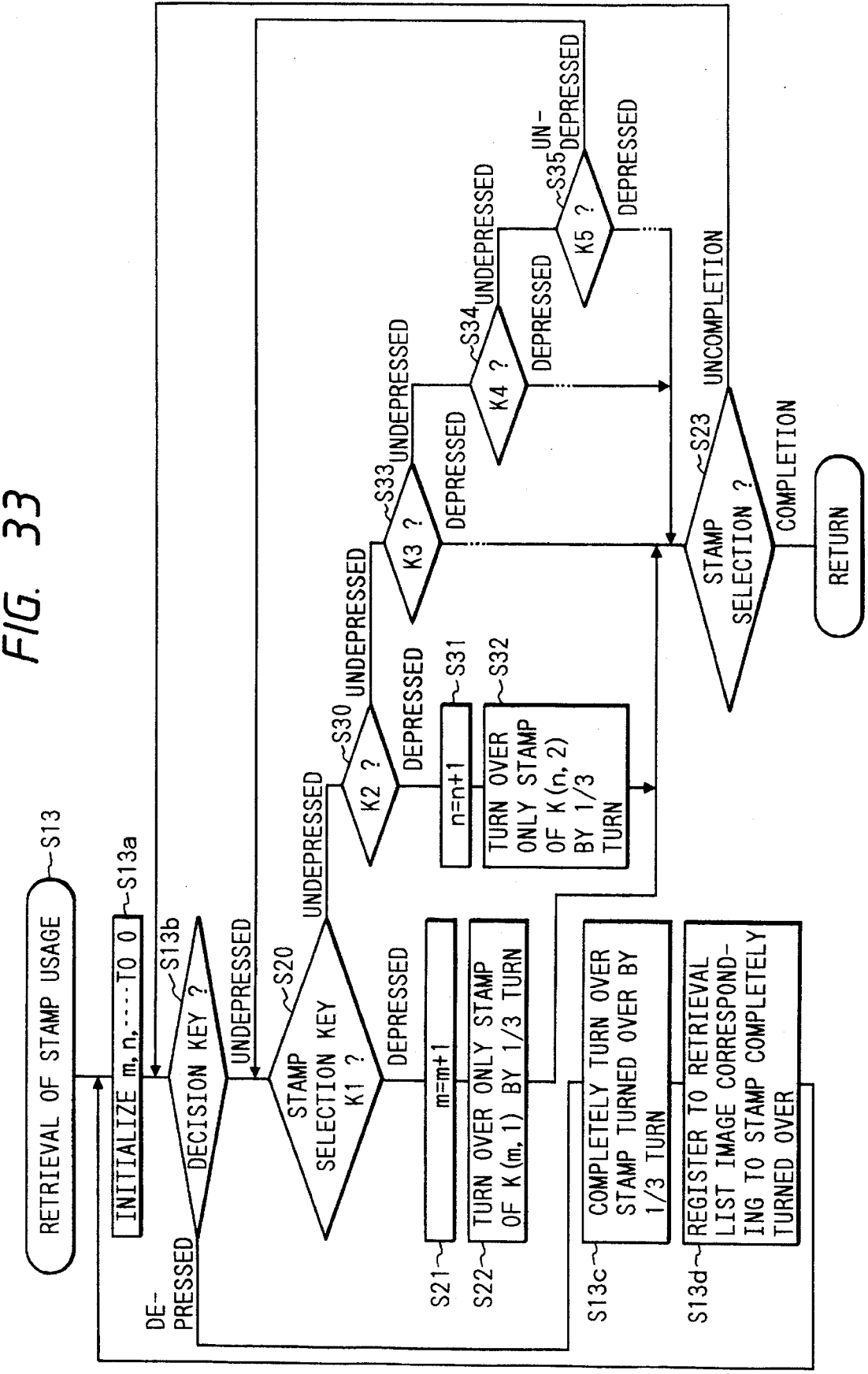
FIG. 33 is a flow chart illustrating an operation of retrieval data selection with use of stamp in the same embodiment.

Stamp usage selection of retrieval data (S12) is executed in an operation shown by the flow chart of FIG. 33 (step S13). In case of using keyword and key number (steps S14 and S16), a given keyword and a given key number are supplied from keyboard 52 to keyword and key number entry positions in a right upper portion of the retrieval mode display shown in FIG. 30-4 for retrieval data selection (steps S15 and S17). When using date ID for retrieval data selection (step S18), the range of date ID is entered in a date ID position in a right portion of the retrieval mode display from keyboard 52 (step S19).

Now, an operation of retrieval data selection with use of stamp will be described.

FIG. 30-4 shows an example of retrieval mode display. In this retrieval mode display, stamps K(1,2) to K(4, 5) are displayed in a four-row five-column matrix as an example of stamp display. In parentheses, left hand figures represent rows, and right hand figures columns. Stamp selection keys K1 to K5 are each provided for each of the stamp columns. Keys K5, K7 and K8 are respectively a decision key, a retrieval execution key and a return key.

Every time one of stamp selection keys K1 to K5 is depressed once, a tentative selection display, i.e., a display indicative of the fact that a stamp is tentatively selected (which is turning-down of stanp by one-third turn) is provided with step-by-step shift of stamp belonging to the depressed stanp selection key. That is, the tentative selection display is shifted by one row after another in the stamp column belonging to the depressed stamp selection key. When decision key K6 is depressed, the tentatively selected stamp is regularly selected, whereupon the tentative selection display is changed to a regular selection display (i.e., which is complete turning of stamp).

FIG. 33 is a flow chart shoving an operation of retrieval data selection with use of stamp in this embodiment.

In a state, in which the retrieval mode display is provided and variables m, n, . . . are reset to zero (step S13a), with depression of stamp selection key K1, for instance (step S20) variable m is incremented by one, and only stamp K(m, 1) is turned down by one-third turn for tentative selection display (step S22). If decision key K6 is depressed at this time (step S13b), the stamp of tentative selection display is completely turned for regular selection display (step S13c), and image corresponding to the stamp in regular selection display is registered in retrieval list (step S13d). Then, the next stamp is selected. For cancelling a stamp in tentative selection display, selection key K1 is depressed with stamp K(4, 1) in tentative selection display. For cancelling stamp in regular selection display, selection key K1 is depressed several times. When a regularly selected stamp is selected again, it is turned up by two-third turn to make lower one-third white. By depressing decision key K6 in this state, the regular selection of this stamp is cancelled.

When stamp selection key K2 is depressed (step S30), variable n is incremented by one (step S31), and only stamp K(n, 2) is turned down by one-third turn for tentative selection display (step S32). If decision key K6 has been depressed at this time (step S13b), the tentatively selected stamp is changed to regular selection display in the manner as described above, and image corresponding to this regularly selected stamp is registered in retrieval list. Then, the next stamp is selected, and if decision key K6 has not been depressed, the routine returns to step S20.

Variables m and n represent rows in the stamp matrix shown in FIG. 30-4. Variables p, q and r represent rows of matrix represented by stamp selection keys K3 to K5.

Check as to whether stamp selection keys K3 to K5 have been depressed is also executed (steps S33 to S35). If these keys have been depressed, variables p, q and r representing respective rows are each incremented by one, and tentative selection display of stamp belonging to a stamp selection key in question is shifted down by one row. If stamp selection is not completed (step S23), the routine returns to step S13b as noted above. If decision key K6 is depressed, change to regular selection display is effected in the manner as described above.

In the above way the stamp selection can be effected by providing stamp selection key only for one row, and this means that the number of stamp selection keys can be reduced, while also facilitating the operation of stamp selection.

It is possible to set a combination condition for stamp selection with an OR condition for stamp rows of the matrix and with an AND condition for stamp columns of the matrix. This arrangement permits selection of practical data combinations. As an example, by setting order slits stamps belonging to stamp selection key K1, setting manufactures for stamps belonging on stamp selection key K2 and setting areas or regions for stamps belonging to stamp selection key K3, it it possible to combine images of areas for each order slit and also each manufacture.

Now, an operation of designating the range of date ID when selecting image data will be described.

Figure 34:
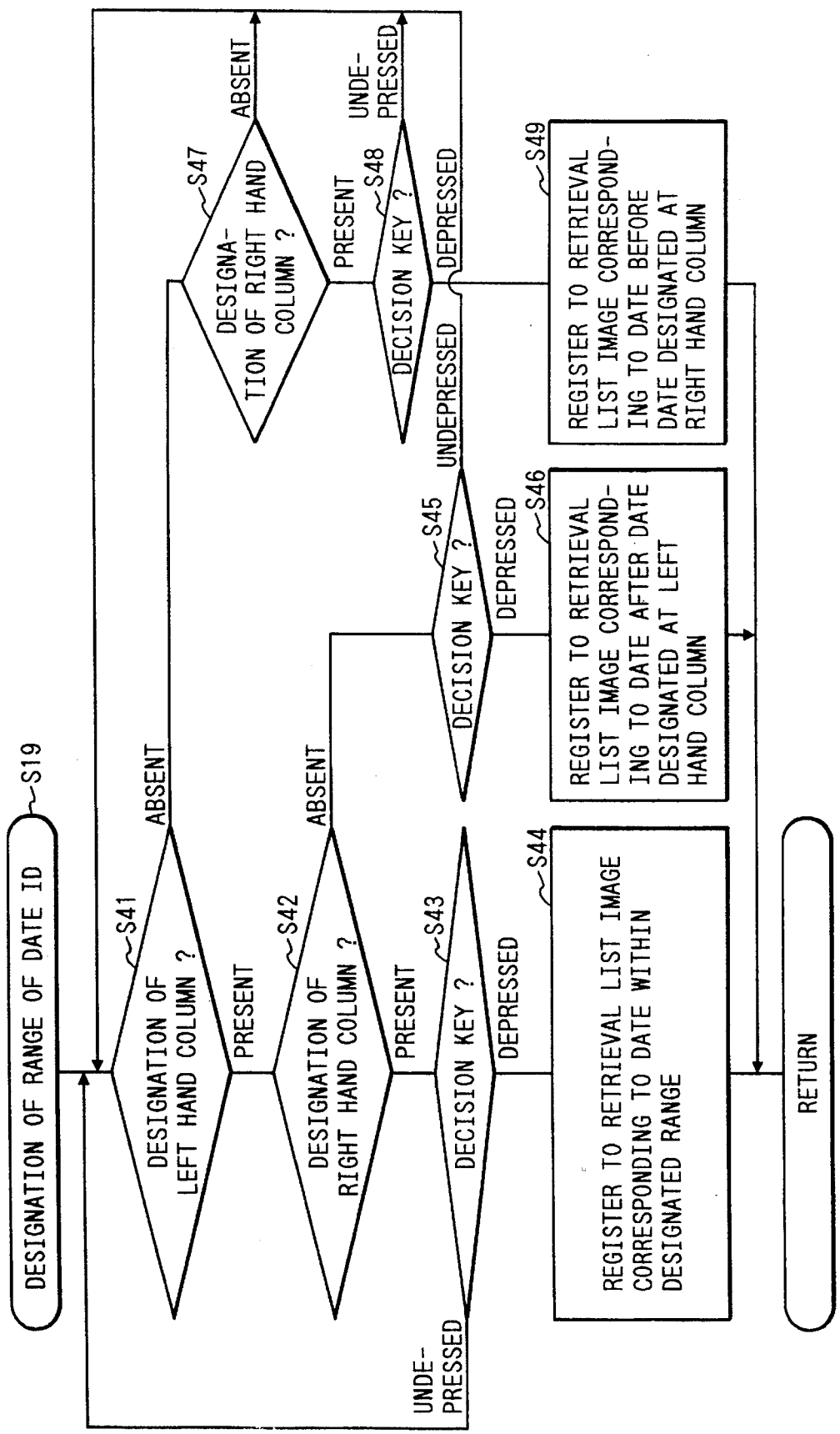
FIG. 34 is a flow chart illustrating an operation of date ID range specification in the same embodiment.

FIG. 34 is a flow chart illustrating the date ID range designation operation in this embodiment. The display on display 54 shown in FIG. 30-4 has a date ID entry position in a right portion. A given date ID (i.e., date and time) is entered in left and right hand columns of this display zone from keyboard 2.

If date ID designation is on the left hand column (step S41), date IR designation is on the right hand column (step S42) and decision key K6 is depressed at this time (step S43), image corresponding to the date ID in a range specified by the left and right hand columns of date ID is registered in retrieval list (step S44). If decision key K6 is depressed in the absence of any designation in the right hand column although there is designation in the left hand column (step S45), images corresponding to date IDs subsequent to the date ID specified by the left hand column are registered in the retrieval list (step S46). Further, if decision key is depressed (step S48) in the presence of designation in the right hand column (step S47) although there is no designation in the left hand column, images corresponding to date IDs before the date ID specified by the right hand column (step S49).

FIG. 30-5 shows an example of retrieval list with date IDs range designated and decided in the above way.

By permitting designation of retrieval data with the date ID designation in the above way, the freedom of retrieval data designation is increased to permit readier retrieval data selection.

In the above embodiment the date and time are made date ID, but it is possible to make some of the date and time such as date or time to be date ID. Further, it is possible to permit the designation of the range of date ID and designation of retrieval data with use of stamp to be executed in advance and let these designations be used in combination for retrieval. Further, besides the designation of date ID the designation of keyword, key number, etc. may be used in combination with the designation of retrieval data with use of stamp. Further, it is possible to arrange such that other keys than decision key (steps S43, S45 and S48), for instance the return key on keyboard 2, may be depressed to the Same end.

Further, while in the above embodiment stamp selection keys K1 to K5 are arranged in a row on screen 54, it is also possible to adopt key arrangement in a column.

What is claimed is:

1. An electronic filing apparatus for retrieving desired image information from a storage medium storing a plurality of image information, said apparatus comprising:

storage means for prestoring a plurality of index images and relation data representative of a relation between each of the plurality of index images and each of the plurality of image information, the index image being an image of a predetermined size, representative of an index for retrieval of image information stored in said storage medium, each of the index images being able to be used as an index of the plurality of image information and being formed from an original image for index information;

display means having a plurality of display locations for displaying the index images read out from said storage means;

index image selection keys each provided for each row of the index images displayed by said display means, for tentatively selecting the index images of a row corresponding to each index image selection key;

a decision key for regularly selecting the index images tentatively selected by said index image selection keys;

display control means for changing a display mode of each of the index images of a row to be tentatively selected by said index image selection keys to a first display mode each time the index image selection key corresponding to the row is depressed, in order to indicate that the index image to be tentatively selected is changed and for changing the display mode of the index image displayed with the first display mode to a second display mode in response to depression of said decision key, in order to indicate that the index image displayed with the second display mode is regularly selected; and retrieval means for retrieving more than one of the information stored in the storage medium according to the index images regularly selected by said decision key and the relation data stored in said storage means.

2. The electronic filing apparatus according to claim 1, wherein said retrieval means executes retrieval of data under an AND condition of relative data for a plurality of index images selected in a same column and under an OR condition of relative data for a plurality of index images selected in different columns.

3. The electronic filing apparatus according to claim 1, wherein said retrieval means executes retrieval of data under an OR condition of a plurality of index images selected in a same column and under an AND condition of relative data for a plurality of index images selected in different columns.

4. An electronic filing apparatus for retrieving desired image information from a storage medium storing a plurality of image information, said apparatus comprising:

storage means for prestoring a plurality of index images and relation data representative of a relation between each of the plurality of index images and each of the plurality of image information, the index image being an image of a predetermined size, representative of an index for retrieving the image information stored in the storage medium, each of the index images being able to be used as the index of the plurality of image information, and each of the index images being formed from an original image for formation of the index;

display means having a plurality of display locations, for displaying the index image read out from said storage means, at each of the display locations;

selecting means for selecting at least one of the plurality of index images displayed at the display locations; and retrieval means for retrieving more than one of the information stored in the storage medium based on the at least one of the index images selected by said selecting means and the relation data stored in said storage means.

5. An electronic filing apparatus according to claim 4, wherein the storage medium has a storage area storing the plurality of index images and said storage means stores the plurality of index images read out from the storage medium.

6. An electronic filing apparatus according to claim 4, wherein said display means displays the plurality of index images in a matrix form.

7. An electronic filing apparatus according to claim 6, wherein the retrieval means retrieves the image information under an OR condition when the plurality of index images in a same row are selected from the plurality of index images displayed in the matrix form by said selecting means, and said retrieval means retrieves the information under an AND condition when a plurality of index images in a same column are selected.

8. An electronic filing apparatus according to claim 4, wherein said selecting means selects the at least one of the index images displayed by said display means by keys provided in a neighborhood of a display screen of said displaying means.

9. An electronic filing apparatus according to claim 4, wherein the storage medium is a magnetic-optical disk.

10. An electronic filing apparatus according to claim 4, further comprising input means for inputting retrieval data to be used for retrieval of the image information stored in the storage medium by said retrieval means, the retrieval data being not an image but code data, wherein said retrieval means retrieves the image information on the basis of the index image selected by said selecting means and the retrieval data input by said input means.

11. An electronic filing apparatus according to claim 10, wherein said display means displays the retrieval data input by said input means together with the index image.

12. An electronic filing apparatus according to claim 10, wherein the retrieval data input by said input means includes a character code.

13. An electronic filing apparatus according to claim 10, wherein said retrieval data input by said input means includes code data representing the date and time of storing of the image information on the storage medium.

14. An electronic filing apparatus according to claim 13, wherein said retrieval means retrieves the image information stored in a range between the data and time represented by two code data included in the retrieval data input by said input means.

15. An electronic filing apparatus according to claim 13, wherein said retrieval means retrieves the image information stored in a range of data and time before or after a date and time represented by the code data included in the retrieval data input by said input means.

16. A method for retrieving desired image information from a storage medium which stores a plurality of image information each comprising images of one or a plurality of pages, comprising the steps of:

reading out a plurality of index images prestored in storage means, said plurality of index images representing indexes for retrieval of the image information stored in the storage medium and each of the plurality of index images being able to be used as the index of the plurality of image information;

displaying the plurality of index images read out in said reading step on display means having a plurality of display locations;

selecting at least one of the plurality of index images displayed in said displaying step; and retrieving more than one of the image information stored in the storage medium, based on the index image selected in said selecting step, wherein the plurality of image information can be retrieved based on one index image.

17. A method according to claim 16, wherein said reading step includes a step of reading out the plurality of index images from the storage medium and storing the read-out index images in said storage means.

18. A method according to claim 16, wherein in said displaying step, the plurality of index images are displayed in a matrix form.

19. A method according to claim 18, wherein in said retrieving step, the image information is retrieved with an OR condition when the plurality of index images of the same column of the matrix are selected, and the image information is retrieved with an AND condition when the plurality of index images of different columns are selected.

20. A method according to claim 16, further comprising a step of inputting retrieval data comprising code data to be used for retrieval of the image information, wherein in said retrieving step, the image information is retrieved based on the index image selected in said selecting step and the retrieval data input in said inputting step.

21. A method according to claim 20, wherein in said inputting step, the retrieval data including a character code is input.

22. A method according to claim 20, wherein in said inputting step, the retrieval data including the code data indicating date and time when the image information is stored in the storage medium, is input.

23. A method according to claim 22, wherein in said retrieving the step, the image information is retrieved based on a time-scale between two dates and times included in the retrieval data input in said inputting step and the index image selected in said selecting step.

24. A method according to claim 22, wherein in said retrieving step, the image information is retrieved based on a time-scale preceding or subsequent to the data and time included in the retrieval data input in said inputting step and the index image selected in said selecting step.

25. A method according to claim 16, wherein the index image is formed from an original image for index formation.

26. A method according to claim 16, wherein said storage medium is a magnetic-optical disk.

\* \* \* \* \*

UNITED STATES PATENT AND TRADEMARK OFFICE
CERTIFICATE OF CORRECTION

PATENT NO. : 5,572,726
DATED : November 5, 1996
INVENTOR(S) : KAMON HASUO

It is certified that error appears in the above-identified patent and that said Letters Patent is hereby corrected as shown below:

Title page,
AT [56] REFERENCES CITED

Other Publications,
"Database"," should read --Databases",--.

Title page,
AT [57] ABSTRACT

Line 7, "a unit for selecting at least one index image from a" should be deleted.
Line 8, should be deleted.

COLUMN 1

Line 48, "time" should read --long time--.

COLUMN 3

Line 46, "circuit 19" should read --circuit 18--.
Line 54, "bus 26." should read --bus 30.--.

COLUMN 4

Line 22, "crystals" should read --crystal--.
Line 44, "own" should read --its own--.

COLUMN 5

Line 34, "peculier" should read --peculiar--.
Line 48, "own" should read --its own--.

UNITED STATES PATENT AND TRADEMARK OFFICE
CERTIFICATE OF CORRECTION

PATENT NO. : 5,572,726
DATED : November 5, 1996
INVENTOR(S) : KAMON HASUO

It is certified that error appears in the above-identified patent and that said Letters Patent is hereby corrected as shown below:

COLUMN 6

Line 16, "(1)" should read --¶ (1)--.
Line 38, "conceivable;" should read --conceivable:--.
Line 53, "12 CPU 11" should read --12, CPU 11--.

COLUMN 7

Line 5, "sets-" should read --sets--.
Line 6, "image-on" should read --image on--.
Line 9, "it-starts" should read --it starts--.
Line 50, "data,in" should read --data in--.
Line 53, "land" should read --and--.

COLUMN 8

Line 48, "resister," should read --resistor,--.
Line 63, "case" should read --the case--.

COLUMN 9

Line 1, "manner" should read --same manner--.
Line 8, "manner" should read --same manner--.
Lines 9-11, should be deleted.
Line 31, "this" should read --at this--.
Line 46, "own" should read --its own--.

UNITED STATES PATENT AND TRADEMARK OFFICE
CERTIFICATE OF CORRECTION

PATENT NO. : 5,572,726
DATED : November 5, 1996
INVENTOR(S) : KAMON HASUO

Page 3 of 4

It is certified that error appears in the above-identified patent and that said Letters Patent is hereby corrected as shown below:

COLUMN 10

Line 10, "own" should read --its own--.
Line 18, "operators" should read --operator's--.
Line 22, "tire" should read --time--.
Line 32, "transveral" should read --transversal--.
Line 53, "and-image" should read --and image--.
Line 62, "disk" should read --the disk--.

COLUMN 11

Line 55, "stanp" should read --stamp--.
Line 62, "shoving" should read --showing--.
Line 64, "state," should read --state--.

UNITED STATES PATENT AND TRADEMARK OFFICE
CERTIFICATE OF CORRECTION

PATENT NO. : 5,572,726
DATED : November 5, 1996
INVENTOR(S) : KAMON HASUO

It is certified that error appears in the above-identified patent and that said Letters Patent is hereby corrected as shown below:

COLUMN 13

Line 4, "Further, if" should read --Further, if a--.
Line 7, "images corresponding" should read
--images are made to correspond--.
Line 28, "Same" should read --same--.

Signed and Sealed this

Twenty-first Day of October 1997

Attest:

BRUCE LEHMAN

Attesting Officer

Commissioner of Patents and Trademarks